United States Patent
Washburn et al.

(10) Patent No.: US 8,806,059 B1
(45) Date of Patent: Aug. 12, 2014

(54) RULE TREE FOR NETWORK DEVICE

(75) Inventors: James Washburn, Palo Alto, CA (US); Sukhesh Halemane, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1613 days.

(21) Appl. No.: 11/696,822

(22) Filed: Apr. 5, 2007

(51) Int. Cl.
  *G06F 15/173* (2006.01)
  *H04L 12/28* (2006.01)

(52) U.S. Cl.
  USPC .......... 709/240; 709/225; 709/238; 370/351; 370/389

(58) Field of Classification Search
  None
  See application file for complete search history.

(56) References Cited

U.S. PATENT DOCUMENTS

| | | | |
|---|---|---|---|
| 5,917,821 A * | 6/1999 | Gobuyan et al. | 370/392 |
| 7,246,102 B2 * | 7/2007 | McDaniel et al. | 706/50 |
| 7,249,149 B1 * | 7/2007 | Eatherton et al. | 1/1 |
| 7,478,426 B2 * | 1/2009 | Corl, Jr. et al. | 726/13 |
| 7,536,476 B1 * | 5/2009 | Alleyne | 709/238 |
| 7,539,694 B1 * | 5/2009 | Althoff et al. | 1/1 |
| 7,706,302 B2 * | 4/2010 | Page | 370/254 |
| 7,779,139 B2 * | 8/2010 | Vishwanath et al. | 709/231 |
| 8,166,079 B2 * | 4/2012 | Lewin et al. | 707/803 |
| 2002/0073222 A1 * | 6/2002 | Sonoda et al. | 709/238 |
| 2003/0161293 A1 * | 8/2003 | Kamachi | 370/351 |
| 2004/0028046 A1 * | 2/2004 | Govindarajan et al. | 370/392 |
| 2005/0114657 A1 * | 5/2005 | Kumar et al. | 713/164 |
| 2005/0132034 A1 * | 6/2005 | Iglesia et al. | 709/223 |
| 2005/0135351 A1 * | 6/2005 | Parmar et al. | 370/389 |
| 2006/0015646 A1 * | 1/2006 | Ogilvy | 709/238 |
| 2008/0181139 A1 * | 7/2008 | Rangarajan et al. | 370/256 |
| 2008/0212597 A1 * | 9/2008 | Baryshnikov et al. | 370/408 |

OTHER PUBLICATIONS

IEEE, The Authoritative Dictionary of IEEE Standards Terms, Seventh Edition, Dec. 2000, p. 297.*
Varghese, George, *Network Algorithmics: An Interdisciplinary Approach to Designing Fast Networked Devices*, Elsevier/Morgan Kaufmann Publishers, 2005, pp. 278-285.
N. Borg et al., "Efficient Multi-Field Packet Classification for Qos Purposes," Seventh International Workshop on Quality of Service, 1999, 10 total pages.

* cited by examiner

*Primary Examiner* — Joshua Joo
(74) *Attorney, Agent, or Firm* — Harrity & Harrity, LLP

(57) ABSTRACT

A method may include receiving a packet; determining a set of characteristics of the packet; searching a first tree structure for a rule matching the set of characteristics, where the first tree structure stores a first group of rules, and where each of the first group of rules has a first number and a first type of criteria; searching a second tree structure for the rule matching the set of characteristics, where the second tree structure stores a second group of rules, and where each of the second group of rules has a second number and a second type of criteria, where the number and type of criteria of the second group of rules are different at least in part than the number and type of criteria of the first tree structure; and performing an action if the rule matching the set of characteristics is found.

41 Claims, 17 Drawing Sheets

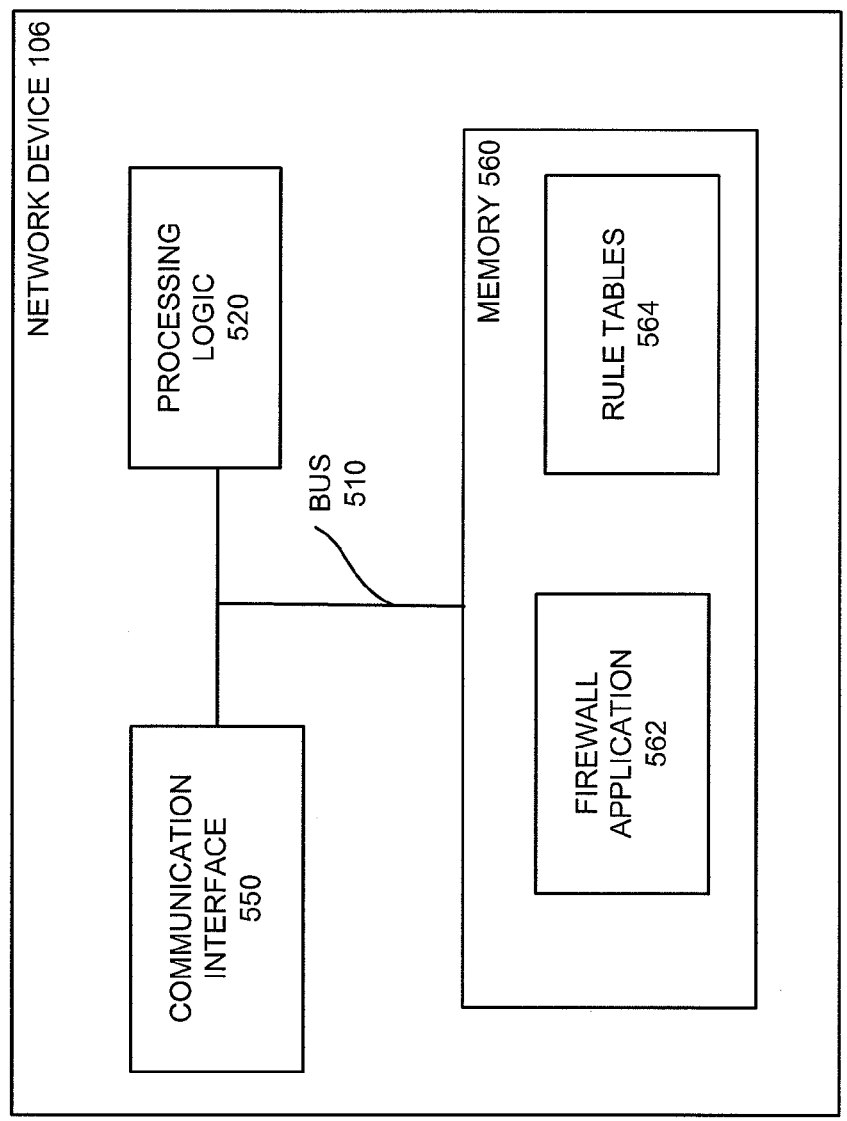

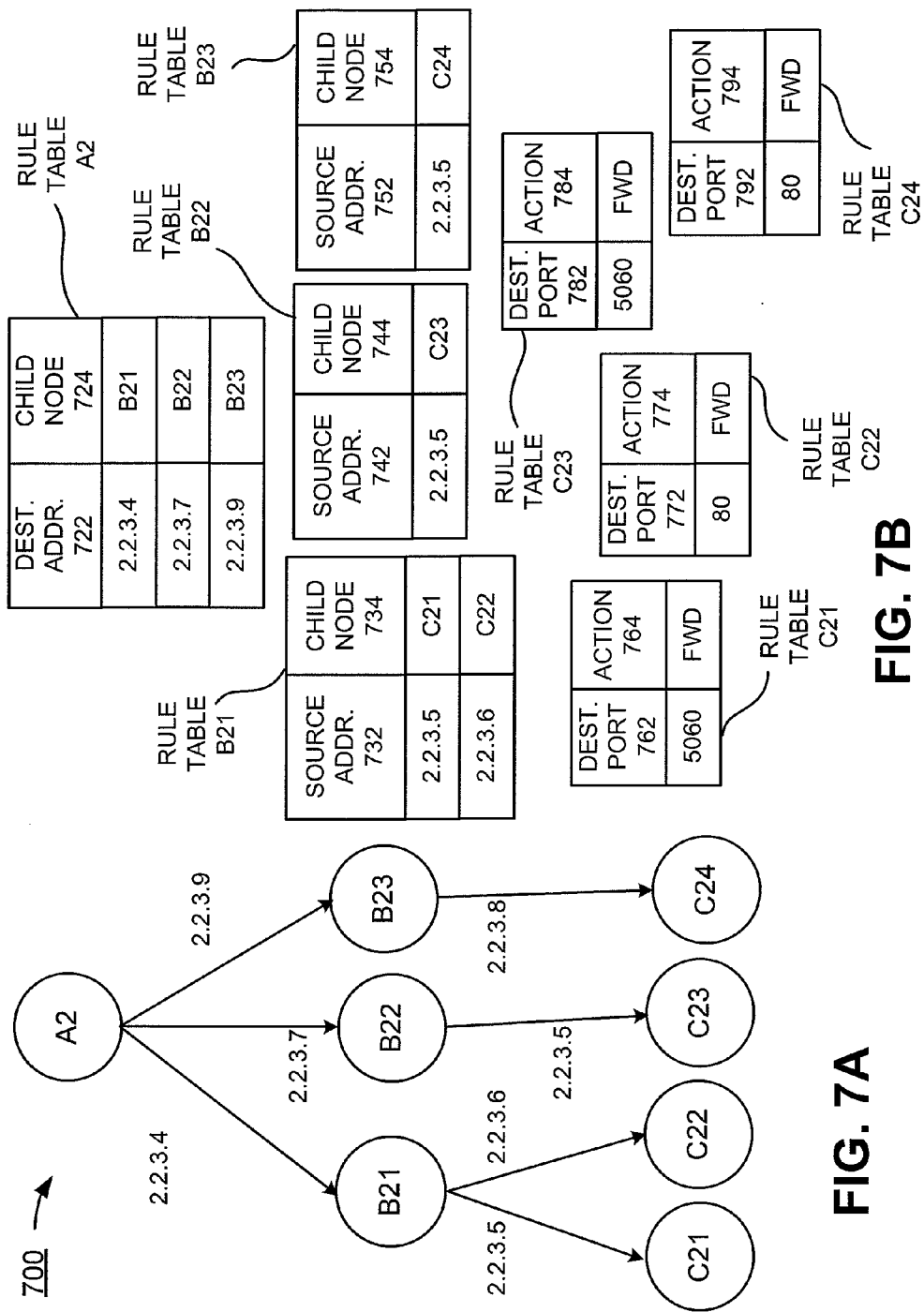

| | DEST. ADDR. 402' | SOURCE ADDR. 404' | DEST. PORT 406' | SOURCE PORT 408' |
|---|---|---|---|---|
| 1202 | 2.2.3.4 | 2.2.3.5 | 5060 | * |
| 1204 | 2.*.*.* | 2.2.3.6 | 80 | * |
| 1206 | 5.2.3.7 | 2.2.3.5 | 5060 | * |
| 1208 | 5.2.3.7 | 2.*.*.* | 80 | * |

HIGH PRIORITY ⟶ LOW PRIORITY

RULE TABLE 364'

FIG. 12

RULE TREE FOR NETWORK DEVICE

BACKGROUND

Networks may use network perimeter protection, such as firewalls, that block unwanted and/or potentially malicious traffic from infiltrating the network. For example, a home network may include a router that implements a firewall in hardware. A laptop computer may also implement a personal firewall in software. The firewall may be aware of rules that determine which packets may be allowed to pass through the firewall and which packets may be blocked.

SUMMARY

According to one aspect, a method may include receiving a packet; determining a set of characteristics of the packet; searching a first tree structure for a rule matching the set of characteristics, where the first tree structure stores a first group of rules, and where each of the first group of rules has a first number and a first type of criteria; searching a second tree structure for the rule matching the set of characteristics, where the second tree structure stores a second group of rules, and where each of the second group of rules has a second number and a second type of criteria, where the number and type of criteria of the second group of rules are different at least in part than the number and type of criteria of the first tree structure; and performing an action if the rule matching the set of characteristics is found.

According to another aspect, a network device may include a communication interface to receive a packet; and processing logic to determine a set of characteristics of the packet, to search a first tree structure for a rule matching the set of characteristics, to search a second tree structure for the rule matching the set of characteristics, and to perform an action if the rule matching the set of characteristics is found, where the first tree structure stores a first group of rules, where a criterion type corresponding to a top level of a group of levels in the first tree structure has a higher priority than criteria types corresponding to other levels of the group of levels in the first tree structure; where the second tree structure stores a second group of rules, and where a criterion type corresponding to a top level of a group of levels in the second tree structure has a higher priority than criteria types corresponding to other levels of the plurality of levels in the second tree structure.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

FIG. 5 is a block diagram of exemplary components of a network device;

FIGS. 6A, 6B, 7A, and 7B are exemplary block diagrams of rule tables;

FIG. 12 is a block diagram of an exemplary rule table;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Exemplary Environment

Figure 1:
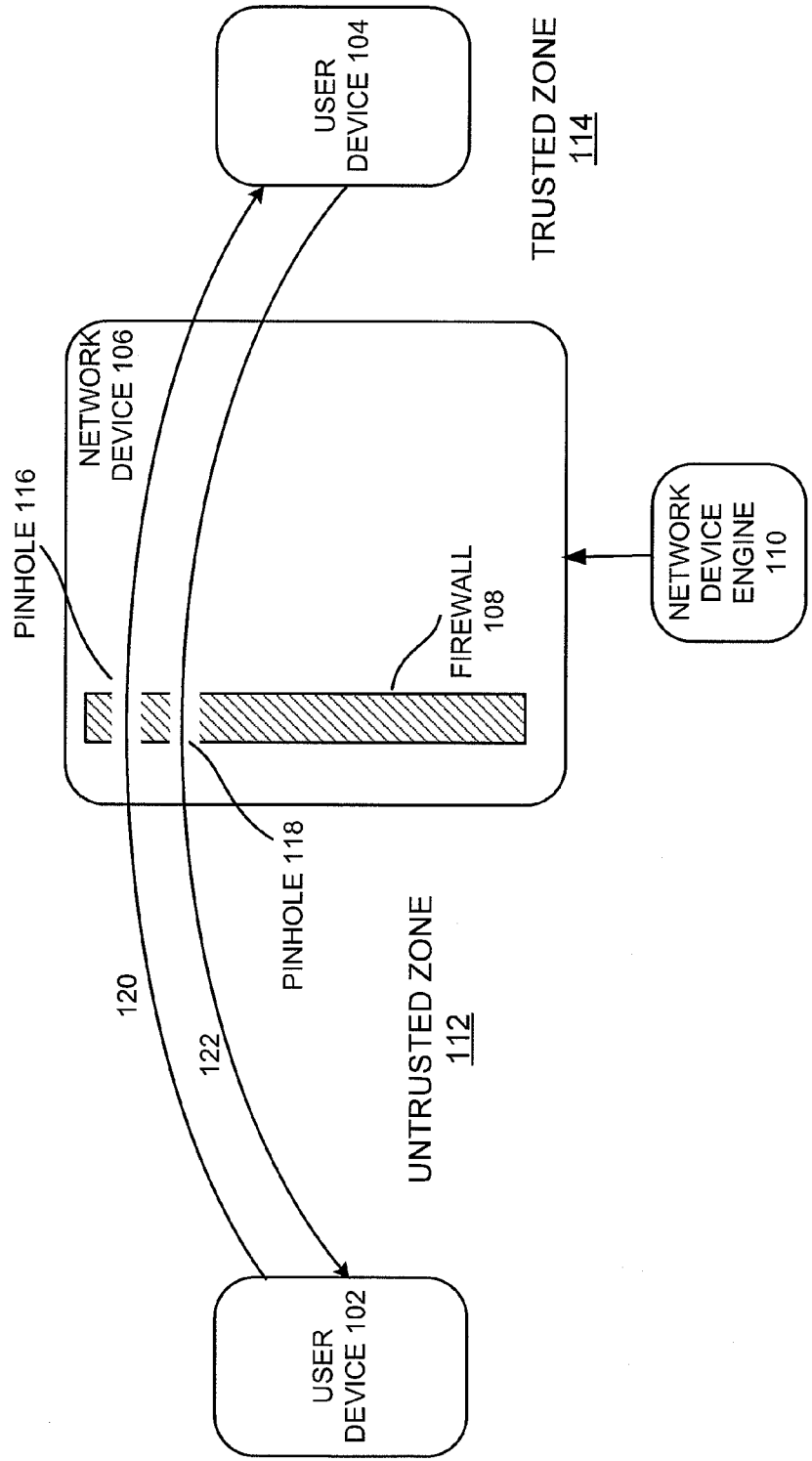
FIG. 1 is a block diagram of an exemplary environment that may include a network device implementing a firewall.

FIG. 1 is a block diagram of an exemplary environment 100 that may include a network device implementing a firewall. Environment 100 may include a user device 102, a user device 104, a network device 106, and a network device engine ("engine") 110. Network device 106 may include a firewall 108. User devices 102 and 104 may include telephones, computers, portable digital assistants, or any other communication devices. Network device 106 and firewall 108 may divide exemplary environment 100 into an untrusted zone 112 (including user device 102) and trusted zone 114 (including user device 104). Untrusted zone 112 may include, for example, the Internet. Trusted zone 114 may include, for example, a telephone company's private network.

Firewall 108 may prevent devices in untrusted zone 112 from accessing devices in trusted zone 114. To do this, in exemplary environment 100, packets may not enter or leave trusted zone 114 without passing through firewall 108. Firewall 108 may enforce rules that define which packets may pass through firewall 108—in one or both directions. For example, firewall 108 may compare a received packet to a criterion or criteria, which may define a rule, to determine whether the packet may be forwarded to its destination or dropped. Comparisons to criteria, for example, may include comparing a received packet's source and destination address, source and destination port number, and/or protocol type to a table of allowed source and destination addresses, source and destination port numbers, and/or protocol types. By doing this comparison, firewall 108 may help protect trusted zone 114 from malicious traffic sent from untrusted zone 112. Besides implementing firewall 108, e.g., forwarding or dropping packets, network device 106 may perform other functions on packets, such as monitoring packets to police user bandwidth.

User devices 102 and 104 may include, for example, telephones that transmit and receive voice data. In this example, the traversal of data from user device 102 through one or more networks to user device 104 may be represented as line 120 ("data stream 120"). The traversal of data from user device 104 through one or more networks to user device 102 may be represented as line 122 ("data stream 122"). When a packet passes through firewall 108, it may be said to have passed through a "pinhole" in firewall 108. For example, as illustrated in FIG. 1, data stream 122 may pass through pinhole 118 and data stream 120 may pass through pinhole 116. A rule may define pinhole 118 and a rule may also define pinhole 120. In one embodiment, user devices 102 and 104 may be any devices that receive or transmit data.

Before user devices 102 and 104 may exchange data streams 120 and 122, e.g., establish a telephone call, user devices 102 and 104 may have to agree on parameters for doing so and, thus, may exchange some signals. For example, user device 102 may have to send the address or port number on which it intends to receive data stream 122. Likewise, user device 104 may have to send the address or port number on which it intends to receive data stream 120. Such signaling may be performed by a session signaling protocol, such as the Session Initiation Protocol (SIP), which may establish sessions between user devices. A session may include a lasting connection between two user devices, for example. Sessions may include telephone calls, multimedia distribution, or multimedia conferences. SIP may not transport data streams 120 or 122, but may allow user devices 102 and 104 to agree on parameters for doing so. Engine 110 may reside between user devices 102 and 104 to assist in the exchange of SIP signals. Engine 110 may also instruct network device 106 as to what rules to implement in firewall 108 for passing or dropping packets, e.g., for defining pinholes. For example, engine 110 may instruct network device 106 to open pinholes 118 and 116 for a session between user devices 102 and 104 to pass data streams 120 and 122. To do this, engine 110 may pass the rules that define pinholes 116 and 118 to network device 106.

User Device

Figure 2:
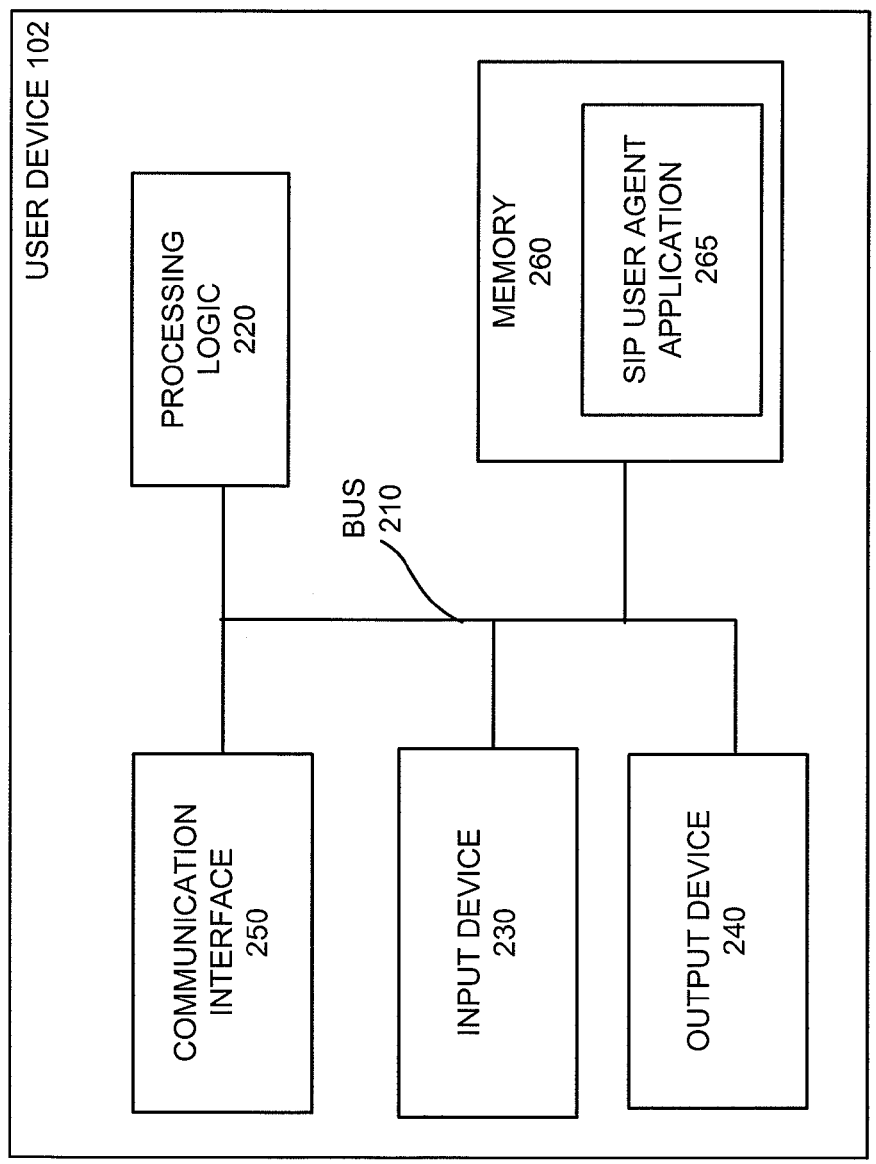
FIG. 2 is a block diagram of exemplary components of a user device.

FIG. 2 is a block diagram of exemplary components of user device 102. User device 104 may be similarly configured. User device 102 may include a bus 210, processing logic 220, an input device 230, an output device 240, a communication interface 250, and a memory 260. User device 102 may include other or different components (not shown) that aid in receiving, transmitting, and/or processing data. Moreover, other configurations of components in user device 102 are possible.

Bus 210 may permit communication among the components of user device 102. Processing logic 220 may include any type of processor or microprocessor that interprets and executes instructions. In other embodiments, processing logic 220 may include an application specific integrated circuit (ASIC), field programmable gate array (FPGA), or the like.

Input device 230 may include a device that permits a user to input information into user device 102, such as a keyboard, a keypad, a mouse, a pen, a microphone, one or more biometric mechanisms, or the like. Output device 240 may include a device that outputs information to the user, such as a display, a printer, a speaker, etc.

Communication interface 250 may include any transceiver-like mechanism that enables user device 102 to communicate with other devices and/or systems. For example, communication interface 250 may include mechanisms for communicating with user device 104 via one or more networks.

Memory 260 may include a random access memory (RAM) or another type of dynamic storage device that stores information and instructions for execution by processing logic 220, a read only memory (ROM) or another type of static storage device that stores static information and instructions for processing logic 220, and/or some other type of magnetic or optical recording medium and its corresponding drive for storing information and/or instructions.

Memory 260 may store a SIP user agent application 265. User agent 265 may include instructions for causing user device 102 to implement SIP signaling on behalf of user device 102. User agent 265 may include instructions to cause user device 102 to assign a port number for a session, such as a call between user devices 102 and 104. User agent 265 may create, modify, or terminate sessions with participants of the session, such as user device 104.

User device 102 may allow a user to establish a session, e.g., a call, with another user device, such as user device 104. User device 102 may perform these and other acts in response to processing logic 220 executing software instructions contained in a computer-readable medium. A computer-readable medium may be defined as one or more tangible memory devices and/or carrier waves. The software instructions may be read into memory 260 from another computer-readable medium or from another device via communication interface 250.

Network Device Engine

Figure 3:
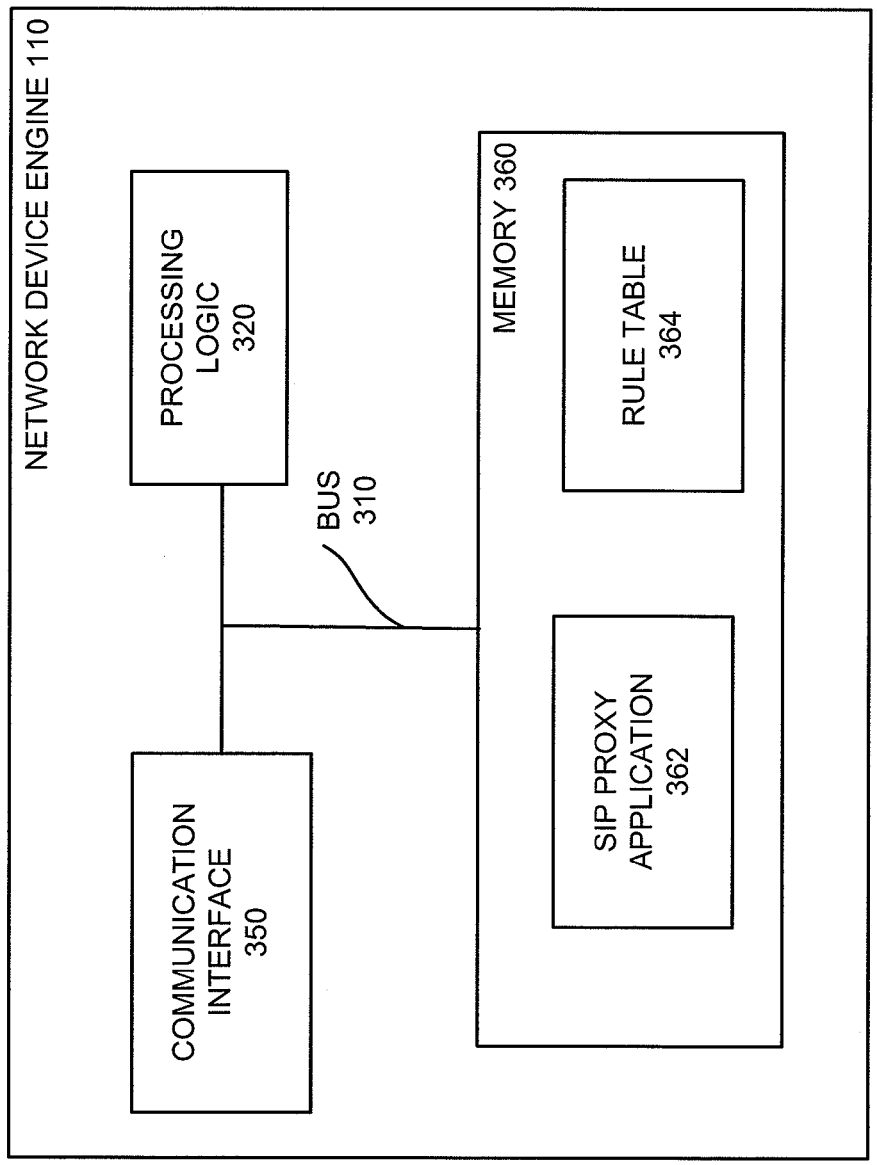
FIG. 3 is a block diagram of exemplary components of a network device engine.

FIG. 3 is a block diagram of exemplary components of engine 110. Engine 110 may include a bus 310, processing logic 320, a communication interface 350, and a memory 360. Engine 110 may include other or different components (not shown) that aid in receiving, transmitting, and/or processing data. Moreover, other configurations of components in engine 110 are possible.

Bus 310 may permit communication among the components of engine 110. Processing logic 320 may include any type of processor or microprocessor that interprets and executes instructions. In other embodiments, processing logic 320 may include an ASIC, FPGA, or the like.

Communication interface 350 may include any transceiver-like mechanism that enables engine 110 to communicate with other devices and/or systems. For example, communication interface 350 may include mechanisms for communicating with network device 106 via one or more networks.

Memory 360 may include a RAM or another type of dynamic storage device that stores information and instructions for execution by processing logic 320, a ROM or another type of static storage device that stores static information and instructions for processing logic 320, and/or some other type of magnetic or optical recording medium and its corresponding drive for storing information and/or instructions. Memory 360 may include a SIP proxy application 362 and a rule table 364.

SIP proxy application 362 may include instructions to assist user devices in exchanging SIP signals to establish sessions. Engine 110 may maintain rule table 364 of rules for network device 106 and firewall 108 to follow when forwarding or dropping packets, for example. In other words, rule table 364 may describe the rules for pinholes in firewall 108. Engine 110 may include instructions to maintain rule table 364. Engine 110 may also include instructions to send messages to firewall 108 to open or close pinholes in firewall 108, e.g., the instructions may include rules that define pinholes to open or close. Engine 110 may perform these and other acts in response to processing logic 320 executing software instructions contained in a computer-readable medium. The software instructions may be read into memory 360 from another computer-readable medium or from another device via communication interface 350.

Figure 4:
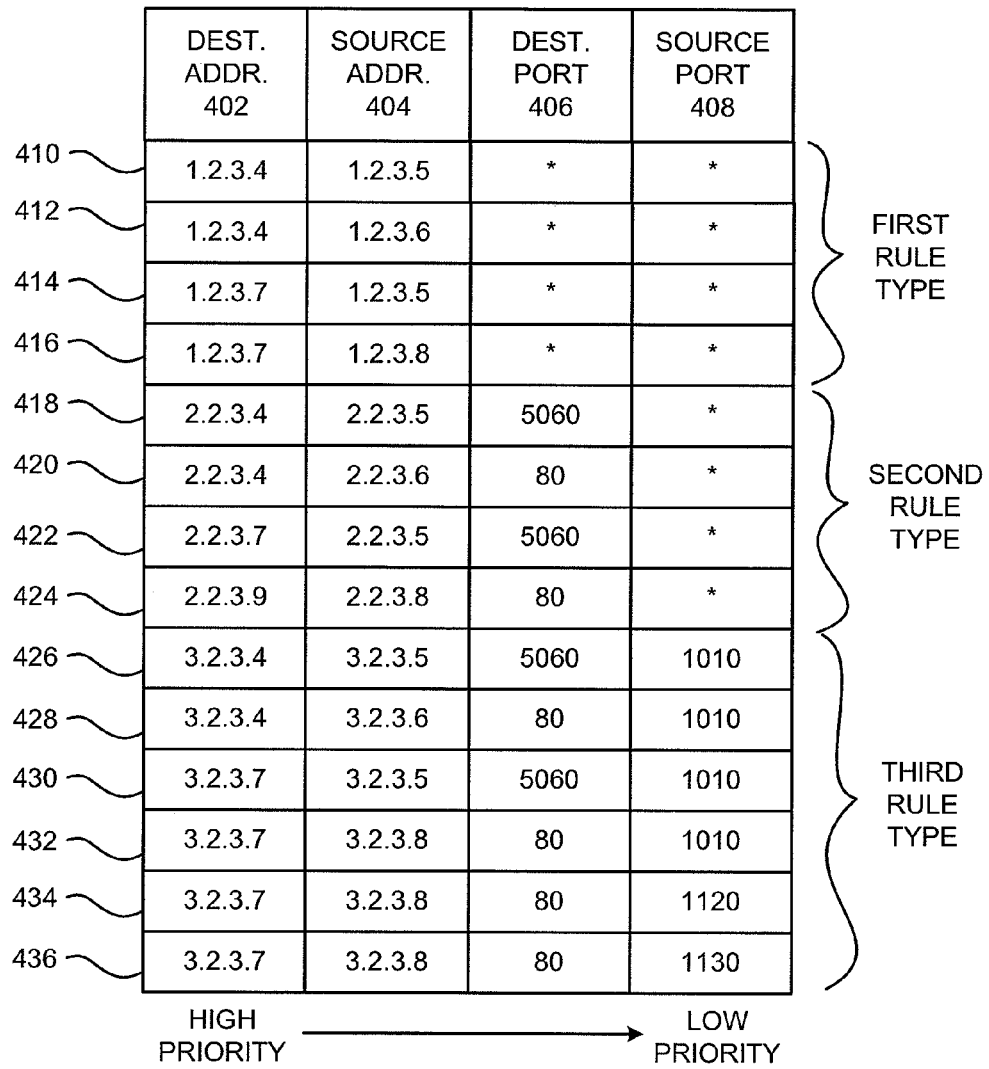
FIG. 4 is a block diagram of an exemplary rule table.

FIG. 4 is an exemplary rule table 364 that may be used in an embodiment described herein. As mentioned above, rule table 364 may store current rules for, e.g., pinholes in, firewall 108. Each entry, e.g., row, in rule table 364 may correspond to a different data stream through firewall 108, e.g., a different pinhole or rule. As illustrated, rule table 364 may include a destination address field 402, a source address field 404, a destination port number field 406, and a source port number field 408.

Rule table 364 may include additional, different, or fewer fields than illustrated in FIG. 4. For example, rule table 364 may include a field (not shown) for protocol type. As another example, rule table 364 may exclude the source address field 404 or source port number field 408. As yet another example, rule table 364 may include a field (not shown) for an action to be performed when a packet matches the rule. The action may be FORWARD ("FWD") if network device 106 may forward the packet to its destination. Other actions are possible, such as INSPECT if network device 106 performs a "policing" function, such as monitoring a user's bandwidth.

Destination address field 402 may identify the destination network address of packets that may pass through firewall 108. Source address field 404 may identify the source network address of packets that may pass through firewall 108. Destination port number field 406 may identify the destination port number of packets that may pass through firewall 108. Source port number field 408 may identify the source port number of packets that may pass through firewall 108. Each field in rule table 364 may define a criterion or condition for a rule.

In the exemplary embodiment of FIG. 4, rule table 364 may store information related to fourteen rules, rule 410 through rule 436, for example. Rule 410, for example, indicates that a packet with a destination address of 1.2.3.4 and a source address of 1.2.3.5—regardless of the destination and source port—may pass through firewall 108. Rule 418, for example, indicates that a packet with a destination address of 2.2.3.4, a source address of 2.2.3.5, and a destination port of 5060—regardless of the source port number—may pass through firewall 108. Rule 426, for example, indicates that a packet with a destination address of 3.2.3.4, a source address of 3.2.3.5, a destination port of 5060, and a source port of 1010, may pass through firewall 108. In rule table 364, an asterisk ("*") may indicate a "wildcard" where the value of the field may not be considered by that rule.

As shown in FIG. 4, rules 410 through rules 416 may form a first rule type; rules 418 through 424 may form a second rule type; and rules 426 through rule 436 may form a third rule type. As used herein, two rules in the same rule type may indicate that the two rules have the same number and type of fields for consideration, e.g., the same type and number of criteria excluding wild cards. For example, rules 410 through 416 include two fields for consideration and both those fields are destination address field 402 and source address field 404. Rules 418 through 424 include three fields, and those fields are destination address field 402, source address field 404, and destination port number field 406. Rule 426 through rule 436 include four field types, and those field types are destination address field 402, source address field 404, destination port number field 406, and source port number field 408. As used herein, two rules may be in different rule types if they do not have the same number of criteria or, if the number of criteria is the same, they do not have the same criteria types.

Other rule types are possible. For example, a rule type (not shown) may include destination address field 402 and destination port number field 406. Another rule type (not shown) may include source address field 404 and source port number field 408.

As shown in FIG. 4, some fields of rule table 364 may have a higher priority than other fields. For example, destination address field 402 may have a higher priority than source address field 404 because destination address field 402 may be more useful to network device 106 for filtering out unwanted packets. As another example, source address field 404 may have a higher priority than destination port number field 406 because source address field 404 may be more useful to network device 106 for filtering out unwanted packets. The usefulness of a field may be defined by a user or may be generated by engine 110 or network device 106. In the exemplary embodiment of FIG. 4, destination address field 402 may have a higher priority than source address field 404, source address field 404 may have a higher priority than destination port number field 406, and destination port number field 406 may have a higher priority than source port number field 408. In another exemplary embodiment, one field in rules table 364 may not be arranged in any particular order of priority.

Network Device and Firewall

FIG. 5 is a block diagram of exemplary components of network device 106. Network device 106 may include a bus 510, processing logic 520, a communication interface 550, and a memory 560. Network device 106 may include other or different components (not shown) that aid in receiving, transmitting, and/or processing data. Moreover, other configurations of components in network device 106 are possible.

Bus 510 may permit communication among the components of network device 106. Processing logic 520 may include any type of processor or microprocessor that interprets and executes instructions. In other embodiments, processing logic 520 may include an ASIC, FPGA, or the like. Communication interface 550 may include any transceiver-like mechanism that enables network device 106 to communicate with other devices and/or systems.

Memory 560 may include a RAM or another type of dynamic storage device that stores information and instructions for execution by processing logic 520, a ROM or another type of static storage device that stores static information and instructions for processing logic 520, and/or some other type of magnetic or optical recording medium and its corresponding drive for storing information and/or instructions. Memory 560 may include a firewall application 562 and rule tables 564.

Firewall application 562 may include instructions for causing network device 106 to enforce rules for forwarding or dropping packets. Rule tables 564 may store these rules for forwarding or dropping packets. Firewall application 562 may also interpret instructions from engine 110 for updating, e.g., adding or deleting, rules stored in rule tables 564. In another embodiment, firewall application 562 may be replaced or supplemented by an application that may allow network device 106 to inspect packets, such as for monitoring a user's bandwidth use, for example. In such an embodiment, rule table 564 may store rules that indicate which packets to inspect.

Network device 106 may receive and forward packets. Network device 106 may perform these and other acts in response to processing logic 520 executing software instructions contained in a computer-readable medium. The software instructions may be read into memory 560 from another computer-readable medium or from another device via communication interface 550.

Figures 6A, 6B:
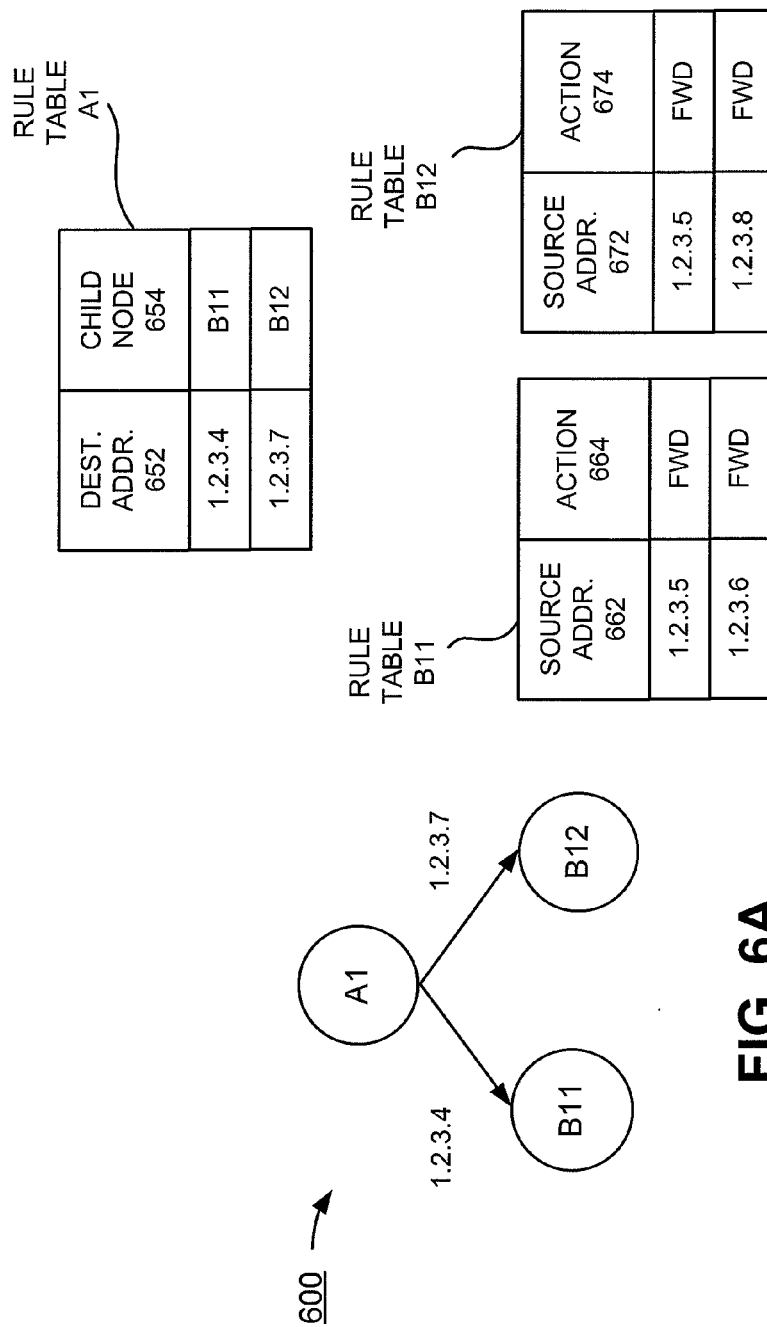

FIGS. 6A, 6B, 7A, and 7B are exemplary block diagrams of rule tables 564. Rule tables 564 may include some of the same data as in rule table 364, shown in FIG. 4, but the data in rule tables 564 may be stored in a different type of data structure, such as a tree structure. For example, FIGS. 6A and 6B are exemplary block diagrams for a tree data structure 600 that may store rules of the first rule type of FIG. 4. First tree 600 may include three nodes: A1, B11, and B12. Node A1 may correspond to the highest priority field of the first rule type, e.g., the criterion/criteria type defined by destination address field 402. Nodes B11 and B12 may correspond to the next highest priority field in the first rule type, e.g., the criterion/criteria type defined by source address field 404. Each node in first tree 600 may correspond to a data structure, e.g., a table, for describing first tree 600. Thus, node A1 may correspond to a rule table A1 of FIG. 6B, node B11 may correspond to a rule table B11, and node B12 may correspond to a rule table B12. In other words, nodes A1, B11, and B12 shown in FIG. 6A may be considered the graphical representation of rule tables A1, B11, and B12 shown in FIG. 6B. Node A1 and/or rule table A1 may be referred to as "node/table A1," node B11 and/or rule table B11 may be referred to as "node/table B11," etc.

Like node A1, rule table A1 may correspond to the highest priority field in rule table 364, e.g., destination address field 402. Rule table A1 may include a destination address field 652 and a child node field 654. Destination address field 652 may include the network addresses listed in destination address field 402 of the first rule type in rule table 364. Child node field 654 may include a pointer to the node/table that stores additional rule information corresponding to the destination address listed in destination address field 652. Rule table A1 may include more, fewer, or different fields than shown in FIG. 6B. For example, network address field 652 may be replaced by another rule criterion, such as port number, source address, etc.

As shown in the exemplary embodiment of FIG. 6B, rule table A1 may include two records, e.g., rows, including destination addresses 1.2.3.4 and 1.2.3.7. These two rows may correspond to the addresses in destination address field 402 in the first rule type of rule table 364. In the embodiment of FIG. 4, the record with destination address 1.2.3.4 points to rule table B11. The record with destination address 1.2.3.7 points to rule table B12.

Like nodes B11 and B12, rule tables B11 and B12 may correspond to the second highest priority field in the first rule type of rule table 364, e.g., source address field 404. Rule table B11 may include a source address field 662 and an action field 664. Source address field 662 may include the network addresses listed in source address field 402 of the first rule type that correspond to the destination address of rule table A1 that points to rule table B11. Action field 664 may include the action that network device 106 may take if a packet matches the corresponding rule. Rule table B11 may include additional, fewer, or different fields than shown in FIG. 6B.

As shown in the exemplary embodiment of FIG. 6B, rule table B11 may include two records, e.g., rows, with source addresses of 1.2.3.5 and 1.2.3.6. These two source addresses may correspond to the destination address of 1.2.3.4, the entry in rule table A1 that points to rule table B11. The record in rule table B11 with source address 1.2.3.5 points to an action of FWD, meaning network device 106 may forward a packet through firewall 108 in case of a match to the corresponding rule. The record in rule table B11 with source address 1.2.3.6 also points to an action of FWD, meaning network device 106 may forward a packet through firewall 108 in case of a match to the corresponding rule.

Rule table B12 may include a source address field 672 and an action field 674. Source address field 672 may include the addresses listed in source address field 402 that correspond to the destination address of rule table A1 that points to rule table B12. Action field 664 may include the action network device 106 may take if a packet matches the corresponding rule. Rule table B12 may include additional, fewer, or different fields than shown in FIG. 6B.

As shown in the exemplary embodiment of FIG. 6B, rule table B12 may include two records, e.g., rows, with source addresses of 1.2.3.5 and 1.2.3.8. These two source addresses may correspond to the destination address of 1.2.3.7, the entry in rule table A1 that points to rule table B12. The record in rule table B12 with source address 1.2.3.5 points to an action of FWD, meaning network device 106 may forward a packet through firewall 108 in case of a match. The record in rule table B12 with source address 1.2.3.8 also points to an action of FWD, meaning network device 106 may forward a packet through firewall 108 in case of a match.

FIGS. 7A and 7B are exemplary block diagrams for a tree data structure 700 that may store rules of the second rule type of FIG. 4. FIG. 7A is a block diagram of a second tree 700 for the second rule type of FIG. 4. Second tree 700 may include eight nodes: A2, B21, B22, B23, C21, C22, C23, and C24. Node A2 may correspond to the highest priority field of the second rule type, e.g., the criterion/criteria type defined by destination address field 402. Nodes B21, B22, and B23 may correspond to the next highest priority field in the second rule type, e.g., source address field 404. Nodes C21, C22, C23, and C24 may correspond to the next highest priority field in the second rule type, e.g., the criterion/criteria type defined by destination port number field 406. The nodes in second tree 700 correspond to data structures, e.g., tables, describing second tree 700. Thus, node A2 may correspond to rule table A2 of FIG. 7B, node B21 may correspond to rule table B21 of FIG. 7B, and node B22 may correspond to rule table B22 of FIG. 7B, etc. In other words, second tree 700 and nodes A2, B21, and B22 may be considered a graphical representation of rule tables A2, B21, and B22 shown in FIG. 7B.

As mentioned, rule table A2 may correspond to the highest priority field in rule table 364, e.g., destination address field 402. Rule table A2 may include a destination address field 722 and a child node field 724. Destination address field 722 may include the network addresses listed in destination address field 402 of the second rule type in rule table 364. Child node field 724 may include a pointer to the node/table that stores additional rule information corresponding to the network address listed in destination address field 722. Rule table A2 may include more, fewer, or different fields than shown in FIG. 7B.

As shown in the exemplary embodiment of FIG. 7B, rule table A2 may include three records, e.g., rows, including destination address 2.2.3.4, 2.2.3.7, and 2.2.3.9. These two rows correspond to the three different addresses in the first rule type of rule table 364. The record with destination address 2.2.3.4 points to rule table B21. The record with destination address 2.2.3.7 points to rule table B22. The record with destination address 2.2.3.9 points to rule table B23.

Like nodes B21, B22, and B23, rule tables B21, B22, and B23 may correspond to the second highest priority field in the first rule type of rule table 364, e.g., source address field 404. Rule table B21 may include a source address field 732 and a child node field 734. Source address field 732 may include the network addresses listed in source address field 402 that correspond to the destination address of rule table A2 that points to rule table B21. Child node field 734 may include a pointer to the node/table that stores additional rule information corresponding to the source address listed in source address field 732. Rule table B21 may include more, fewer, or different fields than shown in FIG. 7B.

As shown in the exemplary embodiment of FIG. 7B, rule table B21 may include two records, e.g., rows, with source addresses of 2.2.3.5 and 2.2.3.6. These two source addresses correspond to the destination address of 2.2.3.4, the entry in rule table A2 that points to rule table B21. The record with source address 2.2.3.5 points to child node/table C21. The record with source address 2.2.3.6 points to a child node/table C22.

Rule table B22 may include a source address field 742 and a child node field 744. Source address field 732 may include the network addresses listed in source address field 402 that correspond to the destination address of rule table A2 that points to rule table B22. Child node field 744 may include a pointer to the node/table that stores additional rule information corresponding to the source address listed in source address field 732. Rule table B22 may include more, fewer, or different fields than shown in FIG. 7B.

Rule table B23 may include a source address field 752 and a child node field 754. Source address field 732 may include the network addresses listed in source address field 402 that correspond to the destination address of rule table A2 that points to rule table B23. Child node field 744 may include a pointer to the node/table that stores additional rule information corresponding to the source address listed in source address field 732. Rule table B23 may include more, fewer, or different fields than shown in FIG. 7B.

Rule tables C21, C22, C23, and C24 may include source address fields 762, 772, 782, and 792, respectively. Rule tables C21, C22, C23, and C24 may also include action fields 764, 774, 784, and 794, respectively. Source address field 762, 772, 782, and 792 may each include the destination port listed in destination port field 406 that correspond to the source address of the corresponding parent rule table that points to the corresponding rule table. Action node fields 764, 774, 784, and 794 may each point to an action that may be performed should there be a match to a corresponding rule. Rule tables C21, C22, C23, and C24 may include more, fewer, or different fields than shown in FIG. 7B.

Exemplary Processing

Figure 8:
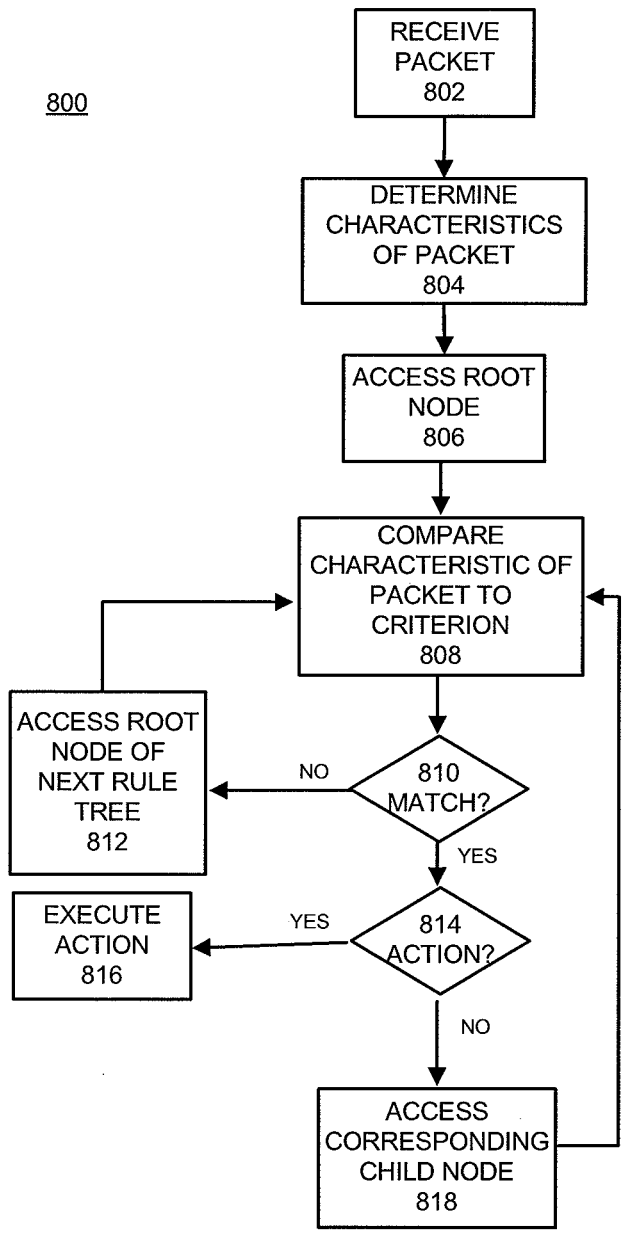
FIG. 8 is a flow chart of a process for searching a rule table.

FIG. 8 is a flow chart of a process 800 for searching rule table 364. Process 800 may begin when network device 106 receives a packet from untrusted zone 112 for forwarding to trusted zone 114, for example. A packet may be received (block 802). The characteristics of the packet may be determined (block 804). Such characteristics of the packet may include, for example, the destination address, the source address, the destination port number, and the source port number. In one implementation, the characteristics of the packet may be obtained from the header of the packet.

A root node/table of a rule tree may be accessed (block 806). A "root" node/table may be the top-most node/table. In one embodiment, the rule tree first accessed may be the rule tree with the least number of nodes. In another embodiment, the rule tree first accessed may be the rule tree with the least number of levels. In yet another embodiment, the rule tree first accessed may be any rule tree. The criterion/criteria in the node/table may be compared to the corresponding characteristic of the received packet (block 808). If there is no match to any criteria (block 810: NO), then a root node of a next rule tree may be accessed (block 812) and process 800 may move to block 808. If there is a match to a criterion (block 810: YES), then, if there is an action that corresponds to the matched criterion (block 814:YES), the action may be performed (block 816). Or, if there is a match to a criterion (block 810:YES), and, if there is a child node that corresponds to the matched criterion (block 814:NO), the child node may be accessed (block 818). If a child node is accessed, then process 800 may return to block 808. Process 800 may continue until a match or until all of the trees, e.g. rule types, have been exhausted. In one embodiment, each tree, such as rule tree 600 and rule tree 700 may be searched simultaneously in parallel rather than serially.

For example, network device 106 may receive a packet with the following characteristics: a destination address of 2.2.3.4, a source address of 2.2.3.6, and a destination port number of 80. Network device 106 may extract the characteristics of the received packet. Network device 106 may access the root node of first tree 600, which may include node/table A1. Network device 106 may compare the entries, e.g., criteria, in destination address field 652 to the corresponding characteristic of the received packet, e.g., the destination address 2.2.3.4. In this example, network device 106 does not find a match and may access the root node/table A2. Network device 106 may compare the entries, e.g., criteria, in destination address field 722 to the corresponding characteristic of the received packet, e.g., the destination address 2.2.3.4. In this example, network device 106 may find a match in node/table A2 corresponding to 2.2.3.4. Network device 106 may access child node/table B21, which corresponds to destination address 2.2.3.4 in table A2. Network device 106 may compare the entries, e.g., criteria, in source address field 732 to the corresponding characteristic of the received packet, e.g., the source address 2.2.3.6. In this example, network device 106 may find a match in node/table B21 corresponding to source address 2.2.3.6. Network device 106 may access child node/table C22, which corresponds to the source address 2.2.3.6 in table/node B21. Network device 106 may compare the entries in destination port number field 772 to the corresponding characteristic of the received packet, e.g., the destination port number of 80. In this example, network device may find a match in node/table C22 corresponding to destination port number 80. Network device 106 may execute the action specified in action field 774, which may include FWD and network device 106 may forward the received packet to the destination address.

Figure 9:
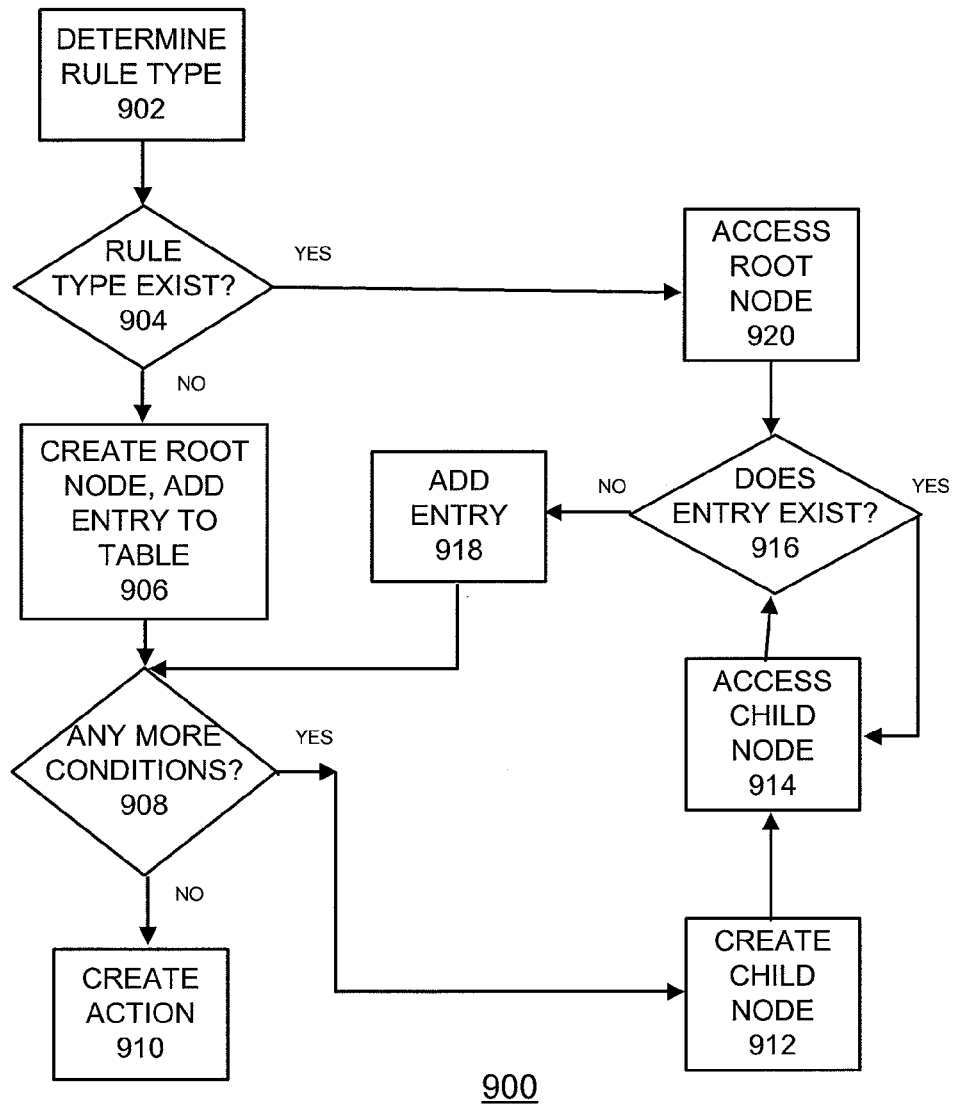
FIG. 9 is a flow chart of an exemplary process for adding a rule to a rule table.

Adding a rule to rule table 364 may include adding a new entry, e.g., row, to rule table 364. Adding a new rule to rule tables 564, however, may involve more steps. FIG. 9 is a flow chart of an exemplary process 900 for adding a rule to rule tables 564. Assume that two user devices attempt to establish a VoIP session through network device 106. Process 900 may begin, for example, with engine 110 instructing network device 106 to add a rule when the VoIP session begins between the two user devices. A rule type of the new rule to be added to rule tables 564 may be determined (block 902). If a rule tree for the rule type does not exist (block 904:NO), a root node may be created and a table entry may be added to the rule table for the root node (block 906). If there is no remaining criterion to the rule (block 908:NO), an action may be added to the new entry (block 910). If there is a remaining criterion to the rule (block 908:YES), a child node may be created and pointed to by the new entry (block 912). The child node may be checked for the next criterion (block 916). Where a new child node was just added (block 912), the child node would not yet have any entries (block 916:NO) and an entry would be added (block 918). After adding a new entry (block 918), process 900 may return to block 908.

If a rule tree for the rule type exists (block 904:YES), the root node of the rule tree may be accessed (block 920). The root node may be checked for the criterion (block 916). If the node does have the criterion as an entry (block 916:YES), the appropriate child node may be accessed (block 914) and process 900 may continue at block 916. If the node does not have the criterion as an entry (block 916:NO), an entry may be added (block 918). If there is another criterion, a child node may be created (block 912) and pointed to by the new entry and process 900 may continue with block 914 as described above. If there is no additional criterion, an action may be created (block 910).

Figure 10:
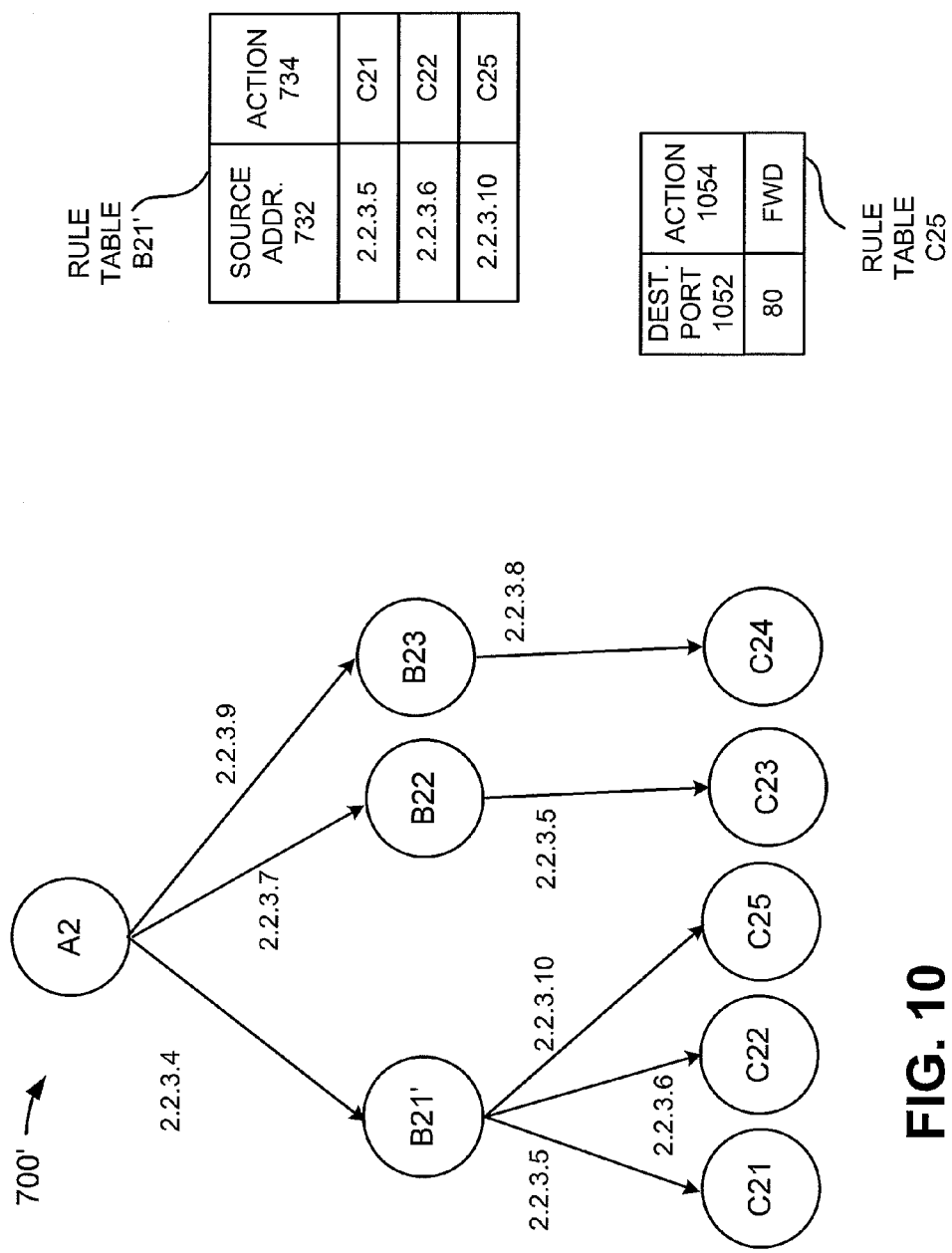
FIG. 10 is a block diagram of an exemplary rule table after a rule has been added.

For example, engine 110 may instruct network device 106 to add a rule allowing a received packet with the following characteristics to pass through firewall 108: destination address of 2.2.3.4, a source address of 2.2.3.10, and a destination port number of 80. Engine 110 may instruct network device 106 to add such a rule by sending the rule to network device 106. Network device 106 may determine the rule type as a second rule type, as shown in FIG. 4. Network device 106 may determine that this rule type exists and may access the root node of tree 700, which may include node/table A2. Network device 106 may determine that an entry for destination address 2.2.3.4 already exists. Network device 106 may access node B21, the node indicated as the child node corresponding to destination address 2.2.3.4. Network device 106 may determine that an entry for source address 2.2.3.10 may not exist in node/table B21. Network device 106 may add source address 2.2.3.10 to node/table B21, creating node/table B21', as shown in FIG. 10. Since the new rule includes another criterion, network device 106 may create a child node corresponding to the new entry 2.2.3.10 in node/table B21'. Network device 106 may create a new node/table C25 shown in FIG. 10. Network device 106 may add an entry to node/table C25, as it may otherwise be empty. Network device 106 may add an entry of 80, corresponding to the destination port of the new rule, e.g., the last criterion of the new rule. As shown in FIG. 10, network device 106 may create an action, such as FWD, for forwarding a received packet that matches the characteristics of the new rule. The updated tree 700' with node/table B21' and node/table C25 is shown in FIG. 10.

Figure 11:
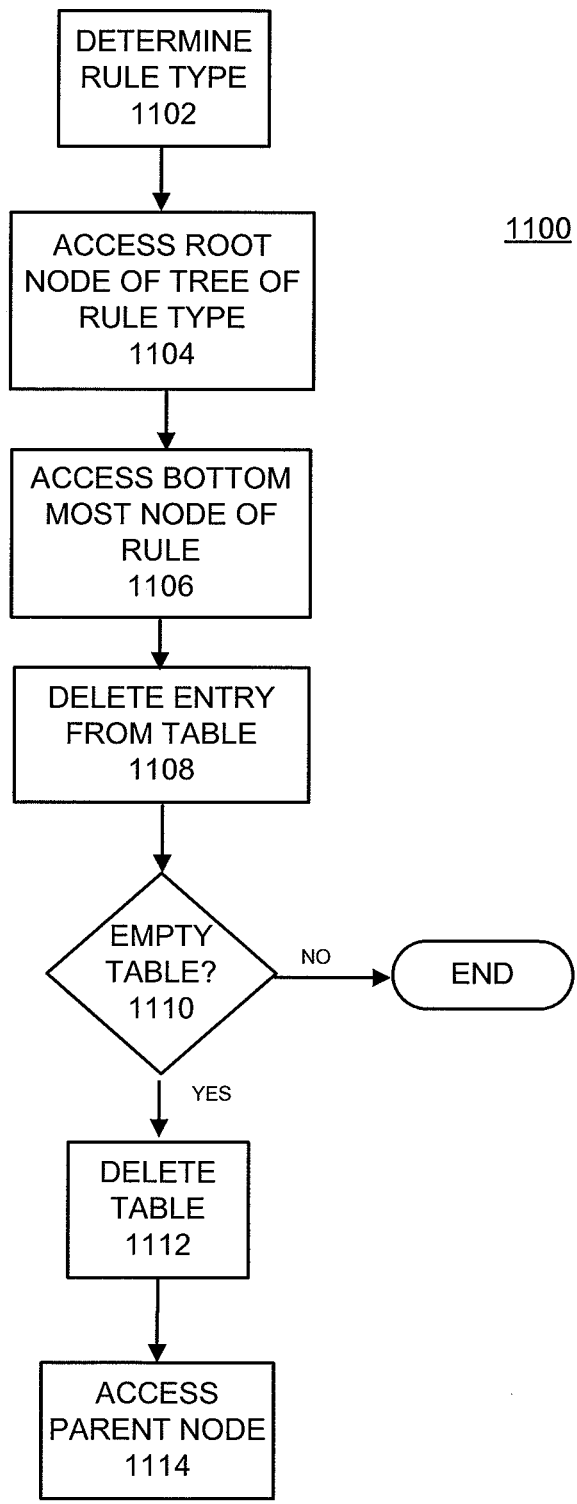
FIG. 11 is a flow chart of an exemplary process for deleting a rule from a rule table.

Deleting a rule from rule table 364 may include deleting an entry, e.g., row, from table 364. Deleting a rule from rule tables 564, however, may involve more steps. FIG. 11 is a flow chart of an exemplary process 1100 for deleting a rule from rule tables 564. Process 1100 may start with engine 110 instructing network device 106 to delete a rule when, for example, the VoIP session ends between the two user devices. The rule type may be determined (block 1102). The root node of the tree of the rule type may be accessed (block 1104). The bottom most node of the rule may be accessed (block 1106). The entry from the table may deleted (block 1108). If the table is empty (block 1110:YES), it may be deleted (block 1112) and the parent node may be accessed (block 1114) and process 1100 may continue at block 1108. If the table is not empty (block 1110:NO), process 1100 may end.

For example, engine 110 may instruct network device 106 to delete the rule previously added in the example above, e.g., to delete the rule with the following characteristics: a destination address of 2.2.3.4, a source address of 2.2.3.10, and a destination port number of 80. In this example, network device 106 may determine that the rule to be deleted is of the second rule type. Network device 106 may access the root node/table of the second rule type, namely node/table A2. Network device 106 may access the bottom most node, e.g., the lowest priority node, of the rule to be deleted. In this example, network device may access node/table C25 shown in FIG. 10 and may remove the entry for the rule to be deleted, namely destination port number 80. Because table C25 would then be empty, network device 106 may delete node/table C25. Network device 106 may access the parent node/tree to node C25, namely node/tree B21'. Network device 106 may delete the entry from table B21' corresponding to the rule to be deleted. Specifically, network device 106 may delete the entry 2.2.3.10. In this case, table B21' shown in FIG. 10 reverts back to table B21 as shown in FIG. 7A. Network device 106 may then have removed the rule to be deleted.

Non-Specific Rule Criteria

FIG. 12 is an exemplary rule table 364' that may be used in an embodiment described herein. Rule table 364' may store current rules for, e.g., pinholes in, firewall 108. As illustrated, rule table 364' may include a destination address field 402', a source address field 404', a destination port number field 406', and a source port number field 408'. Rule table 364' may include additional, different, or fewer fields than illustrated in FIG. 12. Destination address field 402', source address field 404', destination port number field 406', and source port number field 408' may be similar to destination address field 402, source address field 404, destination port number field 406, and source port number field 408, respectively, described above with respect to FIG. 4.

In the exemplary embodiment of FIG. 12, rule table 364 may store information related to four rules, rules 1202 through 1208, for example. Rule 1202 indicates that a packet with a destination address of 2.2.3.4, a source address of 2.2.3.5, and a destination port address of 5060—regardless of the source port—may pass through firewall 108. Rule 1204 indicates that a packet with a destination address of 2.*.*.*, a source address of 2.2.3.6, and a destination port of 80—regardless of the source port number—may pass through firewall 108. A destination address of 2.*.*.* may indicate a first byte of the destination address of "2," while the other bytes may be any value, for example. A destination address of 2.*.*.* may also be written as 2/10, for example, and may be considered a "non-specific rule criterion." Rule 1206 indicates that a packet with a destination address of 5.2.3.7, a source address of 2.2.3.5, and a destination port of 5060—regardless of the source port—may pass through firewall 108. Rule 1210 indicates that a packet with a destination address of 5.2.3.7, a source address of 2.*.*.*, and a destination port of 80—regardless of the source port—may pass through firewall 108.

As shown in FIG. 12, like FIG. 4, some fields of rule table 364' may have a higher priority than other fields. For example, destination address field 402' may have a higher priority than source address field 404' because destination address field 402' may be more useful to network device 106 for filtering out unwanted packets.

Figure 13A:
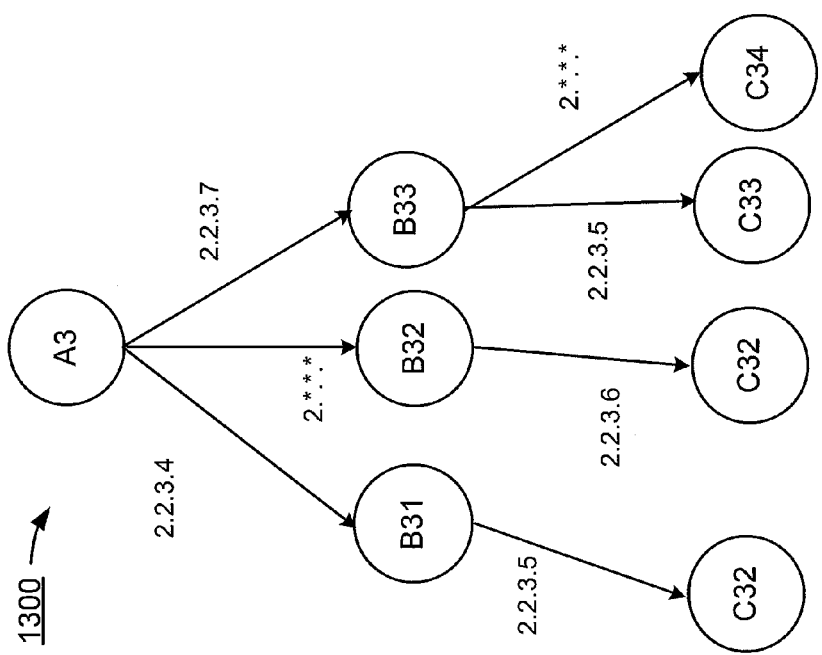
FIGS. 13A and 13B are exemplary block diagrams of rule tables.
Figure 13B:
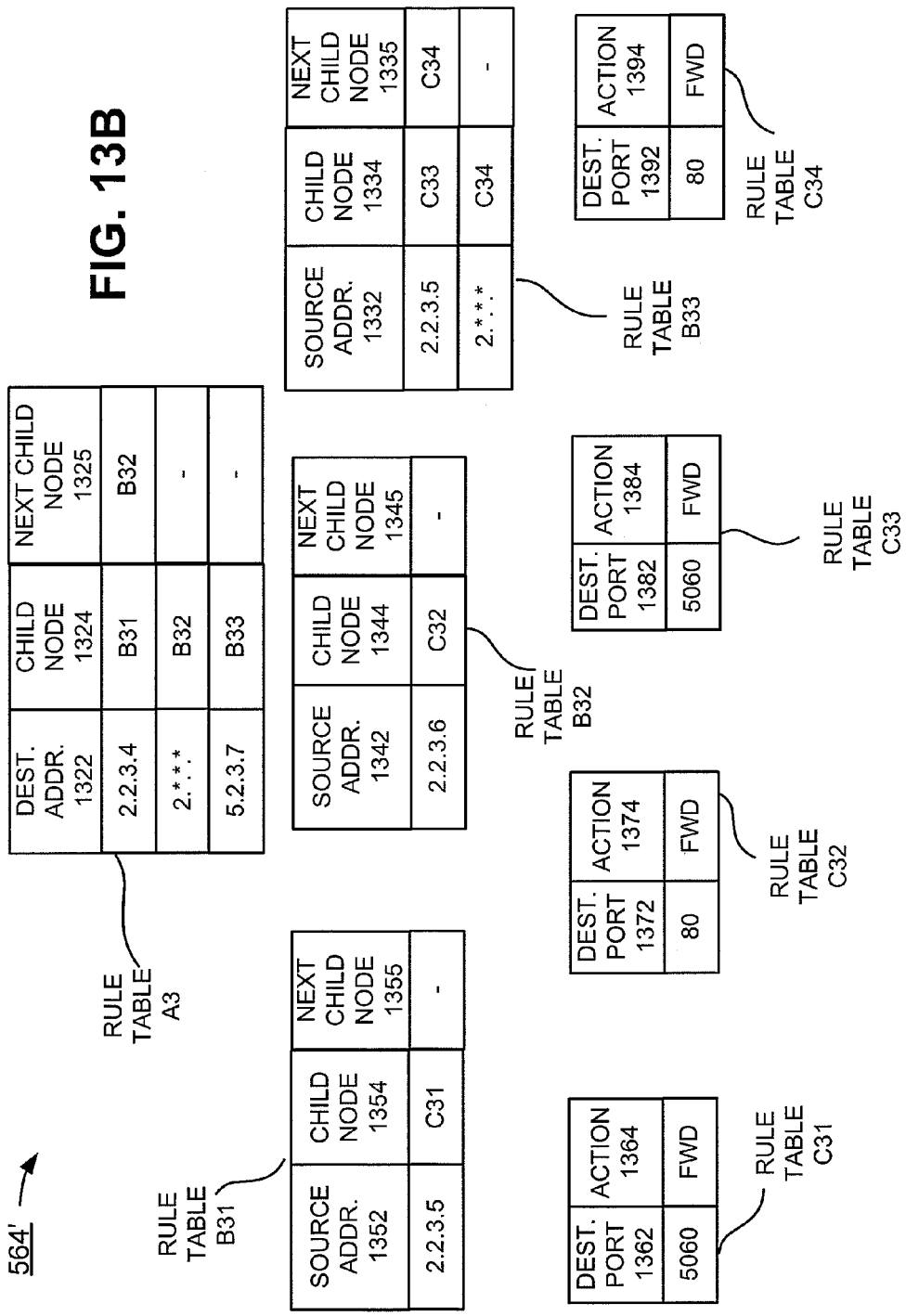

FIGS. 13A and 13B are exemplary diagrams of rule tables 564'. Rule tables 564' may include some of the same data as in rule table 364', shown in FIG. 12, but the data in rule tables 564' may be stored in a different type of data structure, such as a tree structure. For example, FIGS. 13A and 13B are exemplary diagrams for a tree data structure 1300 that may store rules of FIG. 12. Tree 1300 may include eight nodes: A3, B31, B32, B33, C31, C32, C33, and C34. Node A3 may correspond to the highest priority field of rule table 364', e.g., the criterion/criteria type defined by destination address field 402'. Nodes B31, B32, and B33 may correspond to the next highest priority field in rule table 364', e.g., source address field 404'. Nodes C31, C32, C33, and C34 may correspond to the next highest priority field in rule tree 364', e.g., the criterion/criteria type defined by destination port number field 406'. The nodes in tree 1300 correspond to data structures, e.g., tables, describing tree 1300. Thus, node A3 may correspond to rule table A3 of FIG. 13B, node B31 may correspond to rule table B31 of FIG. 13B, node B32 may correspond to rule table B32 of FIG. 13B, etc. In other words, tree 1300 and nodes A3, B31, B32, etc., may be considered a graphical representation of rule tables A3, B31, B32, etc., respectively, shown in FIG. 13B.

As mentioned, rule table A3 may correspond to the highest priority field in rule table 364', e.g., destination address field 402'. Rule table A3 may include a destination address field 1322, a child node field 1324, and a next child node 1325. Destination address field 1322 may include the network addresses listed in destination address field 402' in rule table 364'. Child node field 1324 may include a pointer to a node/table that stores additional rule information corresponding to the network address listed in destination address field 1322. Next child node field 1325 may include a pointer to an additional node/table that stores additional rule information corresponding to the network address listed in destination address field 1322. Next child node field 1325 may also be considered a pointer to an entry in rule table A3 having a child node value the same as the next child node value. Rule table A3 may include more, fewer, or different fields than shown in FIG. 13B.

As shown in the exemplary embodiment of FIG. 13B, rule table A3 may include three records, e.g., rows, including destination address 2.2.3.4, 2.*.*.*, and 5.2.3.7. These three rows correspond to the three different addresses in rule table 364'. The record with destination address 2.*.*.* points to rule table B32. The record with destination address 2.2.3.4 points to node/table B31. A destination address criterion/criteria of 2.2.3.4 may be considered "more specific" than 2.*.*.* because any address meeting the former criterion/criteria would also meet the latter criterion/criteria. Likewise a destination address criterion/criteria of 2.*.*.* may be considered "less specific" than 2.2.3.4 because only some of the address that meet the former criterion/criteria would also meet the latter criterion/criteria. Thus, rule table A3 may provide multiple traversal paths when matching an incoming packet, for example, to a rule. In rule table A3, the record with the more specific destination address criterion/criteria of 2.2.3.4 also points to the less specific record in rule table A3, namely the record that points to child node B32. Thus, the record in rule table A3 with destination address 2.2.3.4 also points to a next child node B32. In one embodiment, next child node field 1325 may point to a record in table A3 that is less specific. In one embodiment, if there is more than one less specific record, then next child node field 135 may point to a record in table A3 is the most specific of the less specific nodes. Finally, the record with destination address 5.2.3.7 points to rule table B33.

Like nodes B11, B32, and B33, rule tables B31, B32, and B33 may correspond to the second highest priority field of rule table 364', e.g., source address field 404'. Rule table B31 may include a source address field 1352, a child node field 1354, and a next child node 1355. Source address field 1352 may include the network addresses listed in source address field 402' that correspond to the destination address of the rule in table A3 that points to rule table B31. Child node field 1354 may include a pointer to the node/table that stores additional rule information corresponding to the source address listed in source address field 1352. Next child node field 1355 may include a pointer to an additional node/table that stores additional rule information corresponding to the source address listed in source address field 1352. Next child node field 1355 may also be considered a pointer to an entry in rule table B31 having a child node value the same as the next child node value. Rule table B31 may include more, fewer, or different fields than shown in FIG. 13B.

Rule table B32 may include a source address field 1342, a child node field 1344, and a next child node field 1345. Source address field 1342, child node field 1344, and next child node field 1345 may be similar to source address field 1352, child node field 1354, and next child node field 1355 described above. Rule table B32 may include more, fewer, or different fields than shown in FIG. 13B.

Rule table B33 may include a source address field 1332, a child node field 1334, and a next child node field 1335. Source address field 1332, child node field 1334, and next child node field 1335 may be similar to source address field 1352, child node field 1354, and next child node field 1355 described above. Rule table B33 may include more, fewer, or different fields than shown in FIG. 13B.

As shown in the exemplary embodiment of FIG. 13B, rule table B33 may include two records, e.g., rows, with source addresses of 2.2.3.5 and 2.*.*.*. These two source addresses correspond to the destination address of 5.2.3.7, the entry in rule table A3 that points to rule table B33. The record with source address 2.2.3.5 points to child node/table C33. The record with source address 2.2.3.5 also points to child node/table C34 in next child node field 1335. Next child node 1335 may also considered a pointer to the entry in rule table B33 that points to node/table C34. A source address criterion/criteria of 2.2.3.5 may be considered "more specific" than 2.*.*.* because any address meeting the former criterion/criteria would also meet the latter criterion/criteria. Likewise a source address criterion/criteria of 2.*.*.* may be considered "less specific" than 2.2.3.5 because only some of the address that meet the former criterion/criteria would also meet the latter criterion/criteria. Thus, rule table B33 may provide multiple traversal paths when matching an incoming packet, for example, to a rule. In rule table A3, the record with the more specific source address criterion/criteria of 2.2.3.5 may also point to the less specific record in rule table B33, namely the record that points to child node B32. Thus, the record in rule table B33 with destination address 2.2.3.5 also points to a next child node B32. In one embodiment, next child node field 1335 may point to a record in table B33 that is less specific. In one embodiment, if there is more than one less specific record, then next child node field 1335 may point to a record in table B33 that is the most specific of the less specific nodes. The record with source address 2.*.*.* points to a child node/table C34.

Rule tables C31, C32, C33, and C34 may include destination port fields 1362, 1372, 1382, and 1392, respectively. Rule tables C31, C32, C33, and C34 may also include action fields 1364, 1374, 1384, and 1394, respectively. Destination port fields 1362, 1372, 1382, and 1392 may each include the destination port listed in destination port field 406' that correspond to the source address of the corresponding parent rule table that points to the corresponding child rule table. Action node fields 1364, 1374, 1384, and 1394 may each point to an action that may be performed should there be a match to a corresponding rule. Rule tables C31, C32, C33, and C34 may include more, fewer, or different fields than shown in FIG. 13B.

Additional Exemplary Processing

Figure 14:
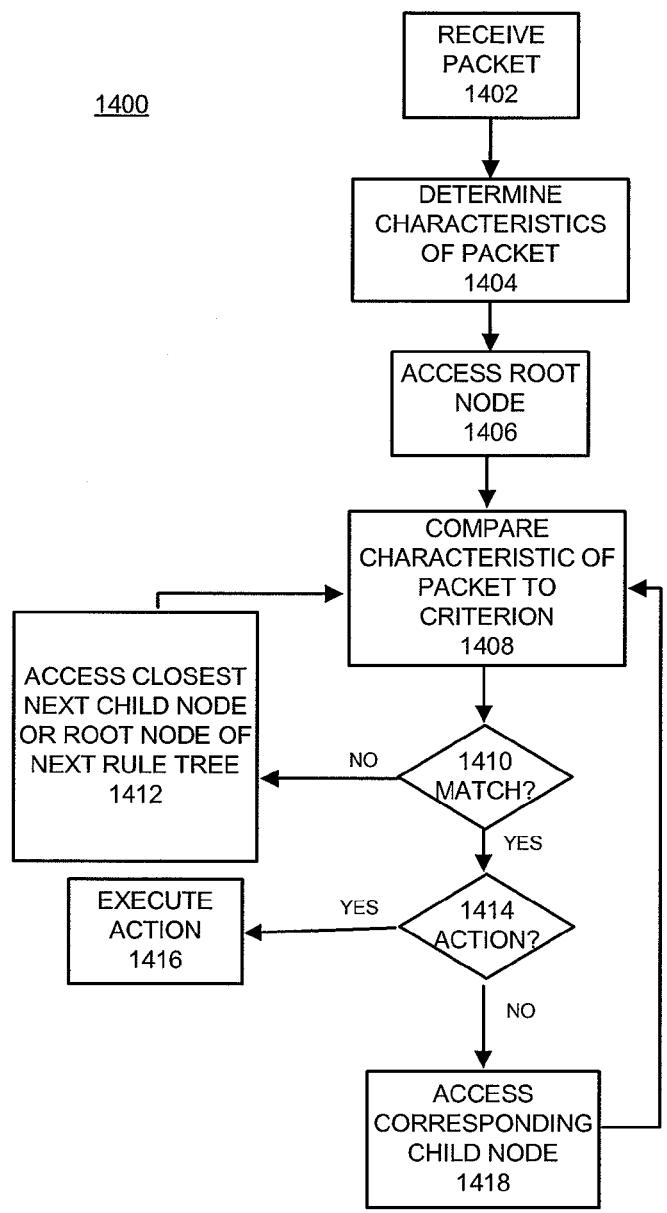
FIG. 14 is a flow chart of a process for searching a rule table.

FIG. 14 is a flow chart of a process 1400 for searching rule table 364'. Process 1400 may be similar in some respects to process 800 of FIG. 8. Further, the portions of process 1400 performed by blocks 1402-1418 may be similar in some respects to process 800 performed by blocks 802-818, respectively.

Process 1400 may begin when network device 106 receives a packet from untrusted zone 112 for forwarding to trusted zone 114, for example. A packet may be received (block 1402). The characteristics of the packet may be determined (block 1404). A root node/table of a rule tree may be accessed (block 1406). The criterion/criteria in the node/table may be compared to the corresponding characteristic of the received packet (block 1408). If there is no match to any criteria (block 1410:NO), then a root node of a next rule tree may be accessed (block 1412).

If there is a match to a criterion (block 1410:YES), then, if there is an action that corresponds to the matched criterion (block 1414:YES), the action may be performed (block 1416). Or, if there is a match to a criterion (block 1410:YES), and, if there is a child node that corresponds to the matched criterion (block 1414:NO), the child node may be accessed (block 1418).

If a child node is accessed, then process 1400 may return to block 1408 where the criterion/criteria in the node/table may be compared to the corresponding characteristic of the received packet (block 1408). If there is no match to any criteria (block 1410:NO), a next child node may be accessed (block 1412) and process 1400 may again return to block 1408. A next child node may be accessed because there may be more than one traversal path through tree 1300, for example. In this situation (no match to any criteria in block 1410), then process 1400 may "backtrack" and follow an alternative path through tree 1300 by accessing a next child node. In one embodiment, the next child node that may be accessed may be the "closest" next child node. A closest next child node may be a node specified in a next child node field in a node/tree record most recently accessed by process 1400, for example. If there is no closest next child node, then a root node of a next rule tree may be accessed (block 1412). Process 1400 may continue until a match or until all of the trees, e.g. rule types, have been exhausted.

For example, network device 106 may receive a packet with the following characteristics: a destination address of 2.2.3.4, a source address of 2.2.3.6, and a destination port number of 80. Network device 106 may extract the characteristics of the received packet. Network device 106 may access the root node of tree 1300, which may include table A3. Network device 106 may compare the entries, e.g., criteria, in destination address field 1322 to the corresponding characteristic of the received packet, e.g., the destination address 2.2.3.4. In this example, network device 106 may find a match in node/table A3 corresponding to 2.2.3.4. Network device 106 may access child node/table B31, which corresponds to destination address 2.2.3.4 in table A3. Network device 106 may compare the entries, e.g., criteria, in source address field 1352 to the corresponding characteristic of the received packet, e.g., the source address 2.2.3.6. In this example, network device 106 may not find a match in node/table B31 corresponding to source address 2.2.3.6. Network device 106 may then access the closest next child node. In this example, the closest next child node may be node B32, which is stored in next child node field 1325 corresponding to destination address 2.2.3.4. Network device 106 may access child node/table B32. Network device 106 may compare the entries in source address field 1342 to the corresponding characteristic of the received packet, e.g., the source address of 2.2.3.6. In this example, network device 106 may find a match in node/table B32 corresponding to source address of 2.2.3.6. Network device 106 may access child node/table C32, which is the child node corresponding to source address 2.2.3.6 in node/table B32. Network device 106 may compare the entries in source address field 1372 to the corresponding characteristic of the received packet, e.g., the destination port 80. In this example, network device 106 may find a match in node/table C32 corresponding to destination port 80. Network device 106 may execute the action specified in action field 1374, which may include FWD and network device 106 may forward the received packet to the destination address.

Figure 15:
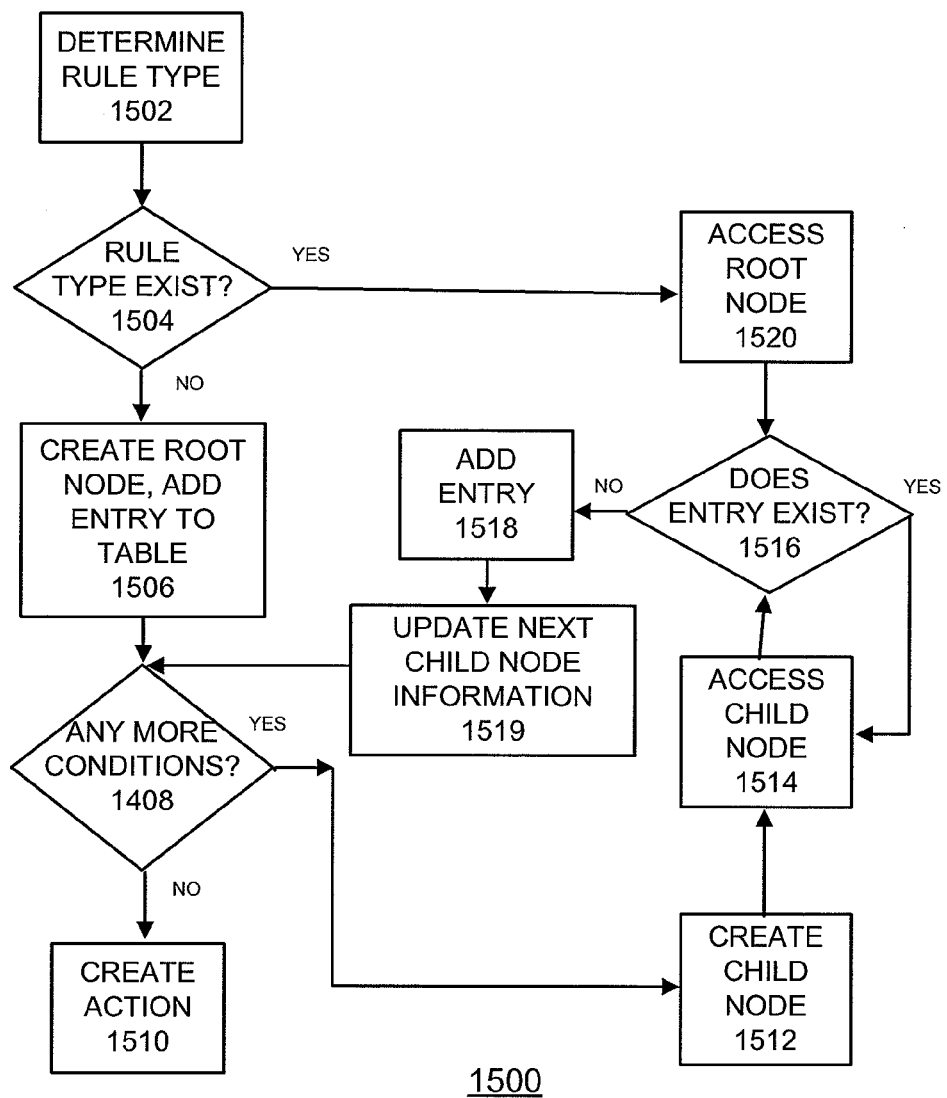
FIG. 15 is a flow chart of an exemplary process for adding a rule to a rule table.

FIG. 15 is a flow chart of an exemplary process 1500 for adding a rule to rule tables 564'. Process 1500 may begin, for example, with engine 110 instructing network device 106 to add a rule when a VoIP session begins between two user devices. Process 1500 may have some similarities to process 900 of FIG. 9 described above. Further, the process performed by blocks 1502-1518 and 1520 may have some similarities to the process performed by blocks 902-918 and 920, respectively, described above with respect to FIG. 9.

A rule type of the new rule to be added to rule tables 564 may be determined (block 1502). If a rule tree for the rule type does not exist (block 1504:NO), a root node may be created and a table entry may be added to the rule table for the root node (block 1506). If there is no remaining criterion to the rule (block 1508:NO), an action may be added to the new entry (block 1510). If there is a remaining criterion to the rule (block 1508:YES), a child node may be created and pointed to by the new entry (block 1512). The child node may be checked for the next criterion (block 1516). Where a new child node was just added (block 1512), the child node would not yet have any entries (block 1516:NO) and an entry would be added (block 1518). After adding a new entry (block 1518), next child node information may be updated (block 1519). For example, if the new entry is more specific than an existing entry in the table, the new entry may point to the existing entry using, for example, a next child node field. Process 1500 may return to block 1508.

If a rule tree for the rule type exists (block 1504:YES), the root node of the rule tree may be accessed (block 1520). The root node may be checked for the criterion (block 1516). If the node does have the criterion as an entry (block 1516:YES), the appropriate child node may be accessed (block 1514) and process 1500 may continue at block 1516. If the node does not have the criterion as an entry (block 1516:NO), an entry may be added (block 1518). After adding a new entry (block 1518), next child node information may be updated (block 1519). For example, if the new entry is more specific than an existing entry in the table, the new entry may point to the existing entry using, for example, a next child node field. If there is another criterion, a child node may be created (block 1512) and pointed to by the new entry and process 1500 may continue with block 1514 as described above. If there is no additional criterion, an action may be created (block 1510).

Figure 16:
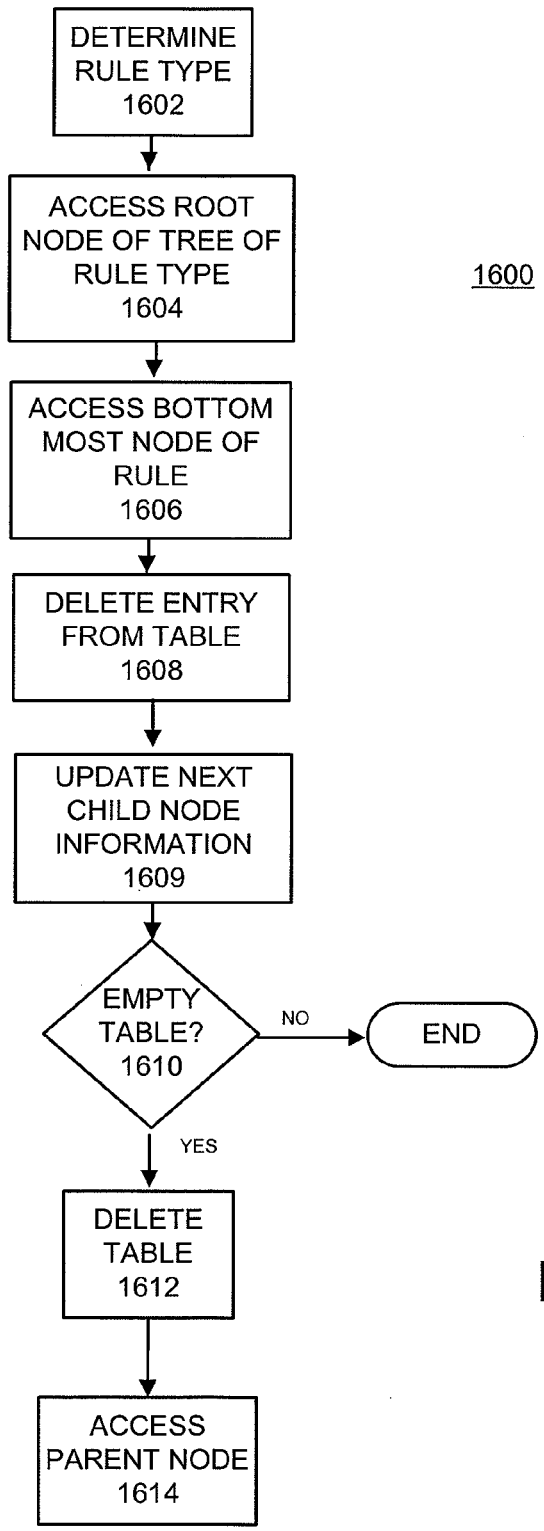
FIG. 16 is a flow chart of an exemplary process for deleting a rule from a rule table.

FIG. 16 is a flow chart of an exemplary process 1600 for deleting a rule from rule tables 564'. Process 1600 may start with engine 110 instructing network device 106 to delete a rule when, for example, a VoIP session ends between the two user devices. Process 1600 may have some similarities to process 1100 of FIG. 11 described above. Further, the process performed by blocks 1602-1608 and 1610-1614 may have some similarities to the process performed by blocks 1102-1108 and 1110-1114, respectively, described above with respect to FIG. 9.

The rule type may be determined (block 1602). The root node of the tree of the rule type may be accessed (block 1604). The bottom most node of the rule may be accessed (block 1606). The entry from the table may be deleted (block 1608).

Next child node information may be updated (block 1609). For example, if there are more or less specific entries in the table than the deleted entry, next child node information may be updated. If the table is empty (block 1610:YES), it may be deleted (block 1612) and the parent node may be accessed (block 1614) and process 1600 may continue at block 1608. If the table is not empty (block 1610:NO), process 1600 may end.

Conclusion

Implementations described herein may allow a network device to search a data structure to determine whether characteristics of a received packet match rules stored in the data structure. Implementations described herein may allow a network device to add rules to the data structure by adding entries to tables in the data structure. Implementations described herein may allow a network device to remove rules from the data structure by deleting entries in tables in the data structure.

In one embodiment, session signaling protocols other than SIP may be implemented.

Implementations described herein may allow network device 106 to forward or drop packets based on rules. Instead of forwarding or dropping packets, however, network device 106 may perform other functions, such as monitoring a user's bandwidth.

The descriptions of exemplary components above, including components shown in FIGS. 2, 3, and 5, include a discussion of software instructions contained in computer-readable media. Alternatively, in each of these implementations, hardwired circuitry may be used in place of or in combination with software instructions to implement processes described herein. Thus, implementations described herein are not limited to any specific combination of hardware circuitry and software.

Although first tree 600 may include rules of the first rule type, it may not be necessary to have all rules of the first rule type to be in first tree 600. For example, two trees may include rules of the same rule type but the two trees may include different rules.

Hardwired circuitry may be used in place of or in combination with software instructions to implement processes described above. Thus, embodiments are not limited to any specific combination of hardware circuitry and software.

It will also be apparent that aspects, as described above, may be implemented in many different forms of software, firmware, and hardware in the implementations illustrated in the figures. The actual software code or specialized control hardware used to implement these aspects is not limiting of the present invention. Thus, the operation and behavior of the aspects were described without reference to the specific software code—it being understood that software or control hardware could be designed to implement the aspects based on the description herein.

Further, although the processes described above, including processes 800, 900, 1100, 1400, 1500, and 1600 may indicate a certain order of blocks, the blocks in these figures may be performed in any order.

In addition, implementations described herein may use the internet-protocol (IP), asynchronous transfer mode (ATM) protocol, or any other type of network protocol. As such, implementations described herein may use IP addresses, ATM addresses, or any other type of network addresses. Implementations may be described in terms of packets, implementations could use any form of data (packet or non-packet).

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
receiving, by one or more devices, a packet;
determining, by the one or more devices, a plurality of characteristics of the packet;
searching, by the one or more devices, a first tree structure for a rule matching the plurality of characteristics,
the first tree structure storing a first plurality of rules,
each of the first plurality of rules having a first type of criteria of a plurality of types of criteria,
the plurality of types of criteria comprising:
a destination address,
a source address,
a source port,
a destination port, and
a protocol type,
the first tree structure comprising a first plurality of levels,
the first plurality of levels corresponding to the plurality of types of criteria, and
searching the first tree structure including:
searching the first plurality of levels in the first tree structure;
searching, by the one or more devices, a second tree structure for the rule matching the plurality of characteristics,
the second tree structure being separate from the first tree structure,
the second tree structure storing a second plurality of rules,
one or more of the second plurality of rules including a second type of criteria,
the second type of criteria being a type of criteria from the plurality of types of criteria,
the second type of criteria being different than the first type of criteria,
the second tree structure comprising a second plurality of levels,
the second plurality of levels corresponding to the plurality of types of criteria, and
searching the second tree structure including:
searching the second plurality of levels in the second tree structure; and
performing, by the one or more devices, an action when the rule matching the plurality of characteristics is found in the first tree structure or the second tree structure.

2. The method of claim 1,
where a first particular type of criteria, of the plurality of types of criteria and corresponding to a top level of the first plurality of levels in the first tree structure, has a higher priority than other types of criteria, of the plurality of types of criteria, corresponding to other levels of the plurality of levels in the first tree structure; and
where a second particular type of criteria, of the plurality of types of criteria and corresponding to a top level of the second plurality of levels in the second tree structure, has a higher priority than other types of criteria, of the plurality of types of criteria, corresponding to other levels of the plurality of levels in the second tree structure.

3. The method of claim 1,
where the first type of criteria includes a more specific criterion and a less specific criterion, and
where searching the first plurality of levels includes:
search the first plurality of levels in the first tree structure according to the more specific criterion, and
searching the first plurality of levels in the first tree structure according to the less specific criterion.

4. The method of claim 1, further comprising:
determining a rule type of a new rule; and
adding the new rule to the first tree structure or the second tree structure based on the rule type.

5. The method of claim 4, further comprising:
adding an entry to a table based on the new rule.

6. The method of claim 1, further comprising:
determining a rule type of a particular rule to be deleted; and
deleting the particular rule from the first tree structure or the second tree structure-based on the rule type.

7. The method of claim 6, further comprising:
deleting an entry, from a table, corresponding to the particular rule.

8. The method of claim 1, where performing the action includes one of:
forwarding the packet to a destination,
dropping the packet, or
inspecting the packet.

9. The method of claim 1, where the plurality of characteristics include a destination address identifier and a destination port identifier.

10. The method of claim 1, where the plurality of characteristics include a source address identifier and a source port identifier.

11. The method of claim 1, where searching the second plurality of levels comprises:
searching the second plurality of levels in the second tree structure while simultaneously searching the first plurality of levels in the first tree structure.

12. A network device comprising:
a communication interface to receive a packet; and
a processor, implemented at least partially in hardware, to:
determine a plurality of characteristics of the packet,
search a first tree structure for a rule matching the plurality of characteristics,
search a second tree structure for the rule matching the plurality of characteristics,
the second tree structure being separate from the first tree structure, and
perform an action when the rule matching the plurality of characteristics is found in the first tree structure or the second tree structure,
the first tree structure storing a first plurality of rules that correspond to at least one of a plurality of criteria types,
the plurality of criteria types including:
a destination address,
a source address,
a source port,
a destination port, and
a protocol type,
a criteria type, corresponding to a top level of a first plurality of levels in the first tree structure, having a higher priority than at least one different criteria type that corresponds to another level of the first plurality of levels in the first tree structure,
the second tree structure storing a second plurality of rules that correspond to at least one of the plurality of criteria types, and
a criteria type, corresponding to a top level of a second plurality of levels in the second tree structure, having a higher priority than at least one different criteria type that corresponds to another level of the second plurality of levels in the second tree structure.

13. The network device of claim 12,
where the first tree structure comprises the first plurality of levels,
where each level, of the first plurality of levels, corresponds to a respective criteria type of the plurality of criteria types,
where the second tree structure comprises the second plurality of levels,
where each level, of the second plurality of levels, corresponds to a respective criteria type of the plurality of criteria types,
where, when searching the first tree structure, the processor is to:
search the first plurality of levels in the first tree structure, and
where, when searching the second tree structure, the processor is to:
search the second plurality of levels in the second tree structure.

14. The network device of claim 13,
where a particular criteria type, of the plurality of criteria types, includes a more specific criterion and a less specific criterion, and
where, when searching the first tree structure, the processor is to:
search the first plurality of levels in the first tree structure according to the more specific criterion, and
search the first plurality of levels in the first tree structure according to the less specific criterion.

15. The network device of claim 13,
where each of the first plurality of rules has a first number of criteria,
where each of the second plurality of rules has a second number of criteria, and
where the second number is different from the first number.

16. The network device of claim 12, where the processor is further to:
determine a rule type of a new rule, and
add the new rule to the first tree structure or the second tree structure based on the rule type.

17. The network device of claim 16, where the processor is further to:
add an entry to a table based on the new rule being added to the first tree structure or the second tree structure.

18. The network device of claim 12, where the processor is further to:
determine a rule type of another rule, and
delete the other rule from the first tree structure or the second tree structure based on the rule type.

19. The network device of claim 18, where the processor is further to:
delete an entry, in a table, corresponding to the other rule based on the rule being deleted.

20. The network device of claim 12, where, when performing the action, the processor is to one of:
forward the packet to a destination,
drop the packet, or
inspect the packet.

21. The network device of claim 12, where the plurality of characteristics include a destination address identifier and a destination port identifier.

22. The network device of claim 12, where the plurality of characteristics include a source address identifier and a source port identifier.

23. A method comprising:
receiving, by one or more devices, a packet;
determining, by the one or more devices, a plurality of characteristics of the packet;
searching, by the one or more devices, a first tree structure for a rule matching the plurality of characteristics,
the first tree structure storing a first plurality of rules,
a first criteria type, corresponding to a top level of a first plurality of levels in the first tree structure, having a higher priority than other criteria types corresponding to other levels of the first plurality of levels in the first tree structure;
searching by the one or more devices, a second tree structure for the rule matching the plurality of characteristics,
the second tree structure being separate from the first tree structure,
the second tree structure storing a second plurality of rules,
a second criteria type, corresponding to a top level of a second plurality of levels in the second tree structure, having a higher priority than other criteria types corresponding to other levels of the second plurality of levels in the second tree structure; and
performing, by the one or more devices, an action when the rule matching the plurality of characteristics is found in the first tree structure or the second tree structure.

24. The method of claim 23,
where the first tree structure comprises the first plurality of levels,
where each level, of the first plurality of levels, corresponds to a respective type of criterion,
where the second tree structure comprises the second plurality of levels,
where each level, of the second plurality of levels, corresponds to a respective type of criterion,
where searching the first tree structure includes:
searching the first plurality of levels in the first tree structure, and
where searching the second tree structure includes:
searching the second plurality of levels in the second tree structure.

25. The method of claim 24,
where each of the first plurality of rules has a first number and a first type of criteria,
where each of the second plurality of rules has a second number and a second type of criteria,
where the second number is different from the first number, and
where the second type of criteria are different at least in part from the first type of criteria.

26. The method of claim 23,
where a type of criterion includes a more specific criterion and a less specific criterion, and
where searching the first tree structure includes:
searching the first plurality of levels in the first tree structure according to the more specific criterion, and
searching the first plurality of levels in the first tree structure according to the less specific criterion.

27. The method of claim 23, further comprising:
determining a rule type of a new rule to be added; and
adding the new rule to the first tree structure or the second tree structure based on the rule type.

28. The method of claim 27, further comprising:
adding an entry to a table based on the new rule being added to the first tree structure or the second tree structure.

29. The method of claim 23, further comprising:
determining a rule type of another rule; and
deleting the other rule from the first tree structure or the second tree structure based on the rule type.

30. The method of claim 29, further comprising:
deleting an entry, in a table, corresponding to the other rule based on the other rule being deleted.

31. The method of claim 23, where performing the action includes one of:
forwarding the packet to a destination,
dropping the packet, or
inspecting the packet.

32. The method of claim 23, where the plurality of characteristics include a destination address identifier and a destination port identifier.

33. The method of claim 23, where the plurality of characteristics include a source address identifier and a source port identifier.

34. A system comprising:
a device, implemented at least partially in hardware, to:
receive a packet;
determine a plurality of characteristics of the packet;
search a first tree structure for a rule matching the plurality of characteristics,
the first tree structure storing a first plurality of rules,
each of the first plurality of rules having a first type of criteria of a plurality of types of criteria,
the plurality of types of criteria comprising:
a destination address,
a source address,
a source port,
a destination port, and
a protocol type,
the first tree structure comprising a first plurality of levels,
the first plurality of levels corresponding to the plurality of types of criteria, and
when searching the first tree structure, the device is to:
search the first plurality of levels in the first tree structure;
search a second tree structure for the rule matching the plurality of characteristics,
the second tree structure being separate from the first tree structure,
the second tree structure storing a second plurality of rules,
one or more of the second plurality of rules including a second type of criteria,
the second type of criteria being a type of criteria from the plurality of types of criteria,
the second type of criteria being different from the first type of criteria,
the second tree structure comprising a second plurality of levels,
the second plurality of levels corresponding to the plurality of types of criteria, and
when searching the second tree structure, the device is to:
search the second plurality of levels in the second tree structure; and perform an action when the rule matching the plurality of characteristics is found in the first tree structure or the second tree structure.

35. The system of claim 34,
where criteria corresponding to a top level of the first plurality of levels has a higher priority than criteria corresponding to other levels of the first plurality of levels, and
where criteria corresponding to a top level of the second plurality of levels has a higher priority than criteria corresponding to other levels of the second plurality of levels in the first tree structure.

36. The system of claim 34, where the device is further to:
determine a rule type of a new rule to be added to the first or second tree structure; and
add the new rule to the first tree structure or the second tree structure based on the rule type.

37. The system of claim 36, where the device is further to:
add an entry to a table based on the new rule being added to the first tree structure or to the second tree structure.

38. The system of claim 34, where the device is further to:
determine a rule type of another rule that is to be deleted from the first or second tree structure; and
delete the other rule from the first tree structure or the second tree structure based on the rule type.

39. The system of claim 38, where the device is further to:
delete an entry in a table based on the other rule being deleted from the first tree structure or the second tree structure.

40. The system of claim 34, where, when performing the action, the device is to:
forward the packet to a destination,
drop the packet, or
inspect the packet.

41. The system of claim 34, where searching of the second tree structure occurs during searching of the first tree structure.

* * * * *